United States Patent
Joseph et al.

(10) Patent No.: US 10,447,738 B2
(45) Date of Patent: Oct. 15, 2019

(54) DYNAMIC POLICY INJECTION AND ACCESS VISUALIZATION FOR THREAT DETECTION

(71) Applicant: Oracle International Corporation, Redwood Shores, CA (US)

(72) Inventors: Aji Joseph, San Jose, CA (US); Paresh Raote, Fremont, CA (US); Lakshmi Hariharan, Marietta, GA (US); Kanishk Mahajan, Dublin, CA (US); Ashish Kolli, Cupertino, CA (US); Moushmi Banerjee, Cupertino, CA (US); Yitzchak Weiser, University Heights, OH (US); Weifang Xie, San Jose, CA (US); Jingyu Cui, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 15/705,377

(22) Filed: Sep. 15, 2017

(65) Prior Publication Data
US 2018/0084010 A1  Mar. 22, 2018

Related U.S. Application Data

(60) Provisional application No. 62/447,759, filed on Jan. 18, 2017, provisional application No. 62/396,016, filed on Sep. 16, 2016.

(51) Int. Cl.
*H04L 29/06* (2006.01)

(52) U.S. Cl.
CPC .......... *H04L 63/20* (2013.01); *H04L 63/108* (2013.01); *H04L 63/1416* (2013.01); *H04L 63/1425* (2013.01)

(58) Field of Classification Search
CPC ...................................................... H04L 63/20
(Continued)

(56) References Cited

U.S. PATENT DOCUMENTS

| 7,581,249 | B2 * | 8/2009 | Bussiere | H04L 63/1408 |
| | | | | 713/189 |
| 7,912,965 | B2 | 3/2011 | Wahl | |
| 9,166,993 | B1 | 10/2015 | Liu | |
| 2005/0108568 | A1 * | 5/2005 | Bussiere | H04L 63/1408 |
| | | | | 726/4 |

(Continued)

FOREIGN PATENT DOCUMENTS

| CA | 2531410 | 6/2007 |
| WO | 2018053337 A1 | 3/2018 |

OTHER PUBLICATIONS

"International Search Report and Written Opinion" issued in PCT/US2017/051886, dated Jan. 9, 2018, 18 pages.
(Continued)

*Primary Examiner* — Jacob Lipman
(74) *Attorney, Agent, or Firm* — Kilpatrick Townsend & Stockton LLP

(57) ABSTRACT

The present disclosure relates generally to threat detection, and more particularly, to techniques for analyzing security events using dynamic policies and displaying a consolidated view of active threats and user activity including the dynamic policies being triggered by the active threats and user activity. Some aspects are directed to the concept of a policy bus for injecting and communicating the dynamic policies to multiple enforcement entities and the ability of the entities to respond to the policies dynamically. Other aspects are directed providing a consolidated view of active threat categories, a count of policies being triggered for each threat category, and associated trends. Yet other aspects are directed to providing a consolidated view of users, applications being accessed by users, and the access policies, if any, implicated by the such accesses.

20 Claims, 26 Drawing Sheets

(58) Field of Classification Search
USPC .......................................................... 726/4
See application file for complete search history.

(56) References Cited

U.S. PATENT DOCUMENTS

| | | | |
|---|---|---|---|
| 2006/0140127 | A1 | 6/2006 | Lee et al. |
| 2008/0022404 | A1 | 1/2008 | Holtmanns et al. |
| 2009/0177675 | A1 | 7/2009 | Trumbull et al. |
| 2013/0312097 | A1 | 11/2013 | Turnbull |
| 2014/0089807 | A1 | 3/2014 | Delrio et al. |
| 2014/0181968 | A1 | 6/2014 | Ge et al. |
| 2014/0245378 | A1 | 8/2014 | Faltyn et al. |
| 2015/0215329 | A1 | 7/2015 | Singla et al. |
| 2018/0084011 | A1 | 3/2018 | Joseph et al. |
| 2018/0084012 | A1 | 3/2018 | Joseph et al. |
| 2018/0288063 | A1 | 10/2018 | Koottayi et al. |
| 2018/0316576 | A1* | 11/2018 | Kang .................. H04L 41/5003 |

OTHER PUBLICATIONS

"Information technology—Security techniques—Selection, deployment and operations of intrusion detection and prevention systems (IDPS)", ISO/IEC 27039:2015, IEC, 3, Rue De Varembe, PO Box 131, CH-1211 Geneva 20, Switzerland, Feb. 11, 2015, pp. 1-48.

Ahn et al., "Security policy decision for automation of security network configuration", Communications, APCC, The 9th Asia-Pacific Conference, Piscataway, NJ, USA,IEEE, vol. 3, 21, Sep. 21, 2003, pp. 1057-1061.

"Invitation to Pay Add'l Fees and Partial Search Report" issued in PCT/US2017/051886, Nov. 7, 2017, 13 pages.

Pal et al., User Behavior Based Anomaly Detection for Cyber Network Security, Happiest Minds Technologies Pvt. Ltd., Jan. 2014, pp. 1-8.

Seven Steps to a Superior Physical Identity and Access Management Solution, White Paper, Alert Enterprise, Available online at: www.alertenterprise.com, Nov. 2015, pp. 1-20.

Turbotodd, Tivoli Access Manager, Available online at: WordPress.com, Feb. 22, 2012, pp. 1-3.

International Application No. PCT/US2017/051886, International Preliminary Report on Patentability dated Mar. 28, 2019, 10 pages.

U.S. Appl. No. 15/705,377, Non-Final Office Action dated May 8, 2019, 9 pages.

U.S. Appl. No. 15/705,388, Non-Final Office Action dated May 8, 2019, 7 pages.

* cited by examiner

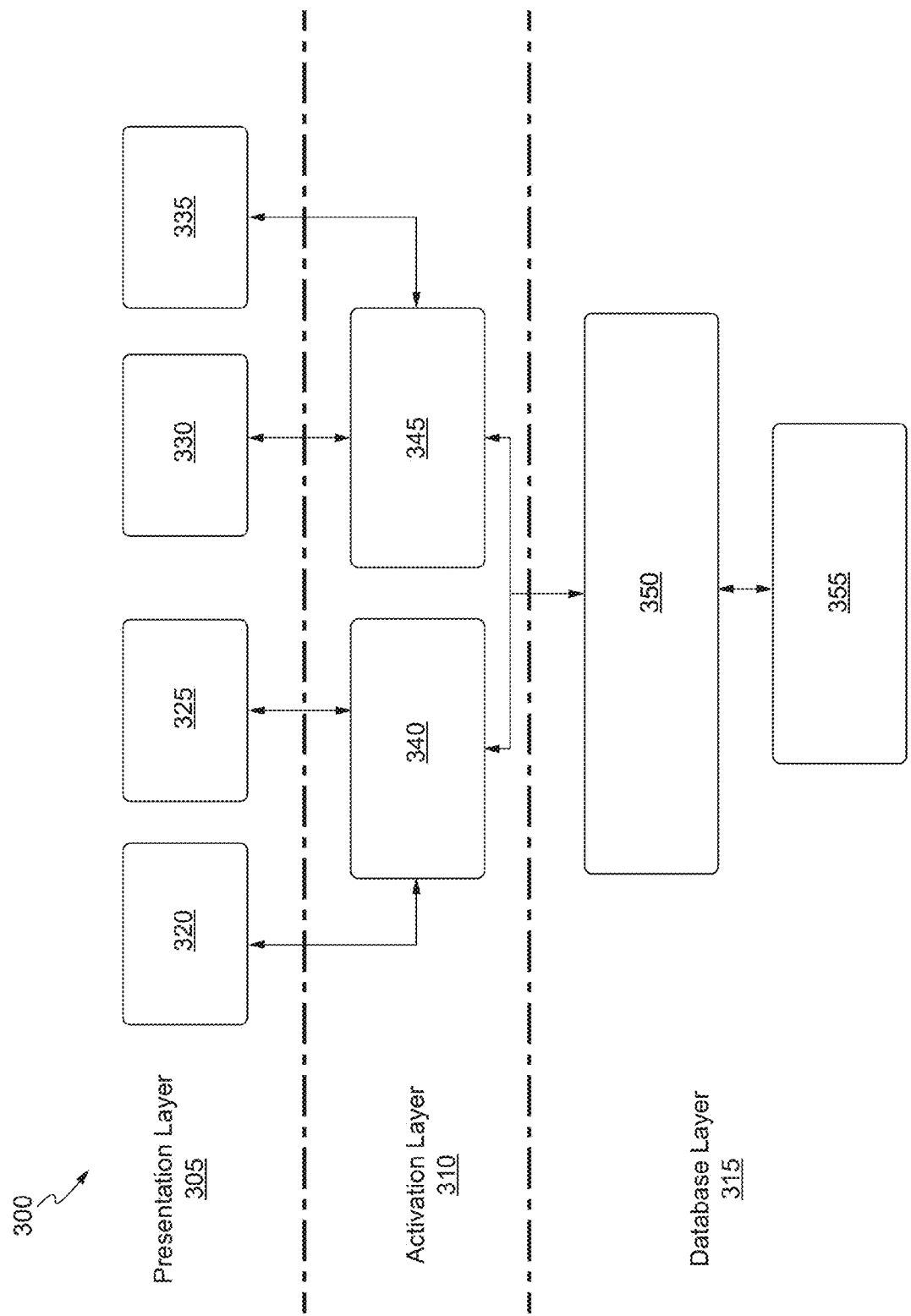

DYNAMIC POLICY INJECTION AND ACCESS VISUALIZATION FOR THREAT DETECTION

CROSS-REFERENCE TO RELATED APPLICATIONS

The present application claims priority and benefit from U.S. Provisional Application No. 62/447,759, filed Jan. 18, 2017, entitled "ACCESS VISUALIZATION FOR THREAT DETECTION" and U.S. Provisional Application No. 62/396,016, filed Sep. 16, 2016, entitled "ACCESS VISUALIZATION FOR THREAT DETECTION," the entire contents of which are incorporated herein by reference for all purposes.

BACKGROUND

The present disclosure relates generally to threat detection, and more particularly, to techniques (e.g., systems, methods, computer program products storing code or instructions executable by one or more processors) for analyzing security events using dynamic policies and displaying a consolidated view of active threats and user activity including the dynamic policies being triggered by the active threats and user activity.

Computer networks have become important tools for modern business. Today a large amount of information is stored in and accessed across such networks by users throughout the world. Much of this information is, to some degree, private or confidential and protection of the information is required. Not surprisingly then, various network security monitor devices have been developed to help uncover attempts by unauthorized persons and/or devices to gain access to computer networks and the information stored therein.

Network security products largely include Intrusion Detection Systems (IDSs), which can be Network or Host based (NIDS and HIDS respectively). Other network security products include firewalls, router logs, and various other event reporting devices. Due to the size of their networks, many enterprises deploy hundreds or thousands of these products through-out their networks. Thus, network security personnel are bombarded with alarms representing possible security threats. Most enterprises do not have the resources or the qualified personnel to individually attend to all of the received alarms.

Therefore, techniques for analyzing security events and providing a threat visualization that presents real-time data analytics in a manner that is easily understandable to an end user is desired.

SUMMARY

As static security rules cannot match evolving threats from comprised users, applications, and hosts, where there is an extremely high volume of user activity (with billions of events per day), a threat intelligence platform may be provided. Some embodiments can provide the ability to provide real-time threat detection and analytics. Certain embodiments can provide visibility into users, application usage and performance. Some embodiments can provide real-time enforcement leveraging existing access controls. Certain embodiments can enforce compliance and block users to unsanctioned applications, perform adaptive authorization and challenges to users based on policy, and perform content inspection for privacy and leakage. Certain embodiments may perform real-time enforcement using rules and analytics. Some embodiments may collect, monitor, and visualize and act on very large volumes of security data in real-time (i.e., billions of events per day)

In particular, systems, methods and computer-readable memory for controlling access to resources accessible in a distributed environment are described. Certain techniques are described for provisioning identity management solutions with an access management and threat detection system and an information management system configured to dynamically analyze security events, control access to resources accessible in a distributed environment, and display a consolidated view of active threats and user activity. In various embodiments, systems and methods are directed to network architecture including the ability to create dynamic policies (including inspection and enforcement policies) and the concept of a policy bus for injecting and communicating the dynamic policies to multiple enforcement entities and the ability of the entities to respond to the policies dynamically, but in potentially different ways. For example, in various embodiments, methods and systems are provided for dynamic access policy provisioning and enforcement based on threat detection, real-time anomaly detection based on real-time threat model, dynamic event and data collection based on inspection policy delivery, and classification of dynamic access policy based on threat levels.

In various embodiments, a system is provided for that includes one or more processors and non-transitory machine readable storage medium, a distributed environment that includes a user device, a plurality of agents, a collection bus, a policy bus, and target system having a resource, and program instructions to collect data pertaining to a security event. The data includes: (i) a source that identifies a user or the user device, and (ii) a destination that identifies the target system or the resource, and the data is collected by the collection bus from at least one of the plurality of agents. The system further includes program instructions to create a dynamic enforcement policy based on the data. The dynamic enforcement policy includes a specification of the source, the destination, an enforcement action, and a duration for the dynamic enforcement policy to be active. The system further includes program instructions to publish the dynamic enforcement policy on the policy bus such that the plurality of agents have access to the dynamic enforcement policy. During the duration for the dynamic enforcement policy to be active, the dynamic enforcement policy overwrites a static enforcement policy that includes a specification of the source and the destination. The program instructions are stored on the non-transitory machine readable storage medium for execution by the one or more processors.

In some embodiments, the system, further includes program instructions to implement the enforcement action for the security event based on the dynamic enforcement policy. The at least one of the plurality of agents implements the enforcement action.

In some embodiments, the duration is a predetermined period of time of at least 5 minutes, the dynamic enforcement policy is rendered inactive and removed from the policy bus after the predetermined period of time has expired, the static enforcement policy is inactive during the predetermined period of time, and the static enforcement policy is active after the predetermined period of time has expired.

In some embodiments, the collection of the data is triggered by an inspection policy published on the policy bus, the inspection policy includes rules for collecting the data in real-time, which is a predefined set of attributes pertaining to the security event, when a set of criteria for the security event match a predefined pattern.

In some embodiments, the distributed environment further includes an analytics server and a machine learning component, and the inspection policy and the dynamic enforcement policy are created by the analytics server and machine learning component.

In some embodiments, the system further includes program instructions to create the inspection policy based on historical data or specifications of the target system or the resource, and program instructions to publish the inspection policy on the policy bus such that the plurality of agents have access to the inspection policy.

In some embodiments, the creating the dynamic enforcement policy includes: classifying the data collected in real-time and historical data into one or more data clusters, analyzing the predefined set of attributes using the one or more data clusters, and creating the source, the destination, the enforcement action, and the duration for the dynamic enforcement policy to be active based on the analysis.

In some embodiments, the one or more data clusters are generated using supervised or unsupervised machine learning or clustering techniques, the analyzing includes calculating a distance of the predefined set of attributes from a centroid of the one or more data clusters, and the enforcement action is determined based on the distance.

In various embodiments, a system a non-transitory machine readable storage medium is provided for having instructions stored thereon that when executed by one or more processors cause the one or more processors to perform a method including collecting data pertaining to a security event. The data includes: (i) a source that identifies a user or a user device, and (ii) a destination that identifies a target system or a resource, and the data is collected by a collection bus from at least one of a plurality of agents. The method further includes creating a dynamic enforcement policy based on the data. The dynamic enforcement policy includes a specification of the source, the destination, an enforcement action, and a duration for the dynamic enforcement policy to be active. The method further includes publishing the dynamic enforcement policy on the policy bus such that the plurality of agents have access to the dynamic enforcement policy. The method further includes implementing the enforcement action for the security event based on the dynamic enforcement policy, and at least one of the plurality of agents implements the enforcement action. During the duration for the dynamic enforcement policy to be active, the dynamic enforcement policy overwrites a static enforcement policy that includes a specification of the source and the destination.

In some embodiments, the duration is a predetermined period of time of at least 5 minutes, the dynamic enforcement policy is rendered inactive and removed from the policy bus after the predetermined period of time has expired, the static enforcement policy is inactive during the predetermined period of time, and the static enforcement policy is active after the predetermined period of time has expired.

In some embodiments, the collection of the data is triggered by an inspection policy published on the policy bus, and the inspection policy includes rules for collecting the data in real-time, which is a predefined set of attributes pertaining to the security event, when a set of criteria for the security event match a predefined pattern.

In some embodiments, the inspection policy and the dynamic enforcement policy are created by an analytics server and machine learning component.

In some embodiments, the method further includes creating the inspection policy based on historical data or specifications of the target system or the resource, and publishing the inspection policy on the policy bus such that the plurality of agents have access to the inspection policy.

In some embodiments, the creating the dynamic enforcement policy includes: classifying the data collected in real-time and historical data into one or more data clusters, analyzing the predefined set of attributes using the one or more data clusters, and creating the source, the destination, the enforcement action, and the duration for the dynamic enforcement policy to be active based on the analysis.

In some embodiments, the one or more data clusters are generated using supervised or unsupervised machine learning or clustering techniques, the analyzing includes calculating a distance of the predefined set of attributes from a centroid of the one or more data clusters, and the enforcement action is determined based on the distance.

In various embodiments, a method if provided for that includes collecting, by a computing system, data pertaining to a security event. The data includes: (i) a source that identifies a user or a user device, and (ii) a destination that identifies a target system or a resource, and the data is collected by a collection bus from at least one of a plurality of agents. The method further includes creating a dynamic enforcement policy based on the data. The method further includes creating, by the computing system, a dynamic enforcement policy based on the data. The dynamic enforcement policy includes a specification of the source, the destination, an enforcement action, and a duration for the dynamic enforcement policy to be active. The method further includes publishing, by the computing system, the dynamic enforcement policy on the policy bus such that the plurality of agents have access to the dynamic enforcement policy. The method further includes implementing, by the computing system, the enforcement action for the security event based on the dynamic enforcement policy, and at least one of the plurality of agents implements the enforcement action. During the duration for the dynamic enforcement policy to be active, the dynamic enforcement policy overwrites a static enforcement policy that includes a specification of the source and the destination.

In some embodiments, the duration is a predetermined period of time of at least 5 minutes, the dynamic enforcement policy is rendered inactive and removed from the policy bus after the predetermined period of time has expired, the static enforcement policy is inactive during the predetermined period of time, and the static enforcement policy is active after the predetermined period of time has expired.

In some embodiments, the collection of the data is triggered by an inspection policy published on the policy bus, and the inspection policy includes rules for collecting the data in real-time, which is a predefined set of attributes pertaining to the security event, when a set of criteria for the security event match a predefined pattern.

In some embodiments, the method further includes creating, by the computing system, the inspection policy based on historical data or specifications of the target system or the resource, and publishing the inspection policy on the policy bus such that the plurality of agents have access to the inspection policy.

In some embodiments, the creating the dynamic enforcement policy includes: classifying the data collected in real-time and historical data into one or more data clusters, analyzing the predefined set of attributes using the one or more data clusters, and creating the source, the destination, the enforcement action, and the duration for the dynamic enforcement policy to be active based on the analysis.

BRIEF DESCRIPTION OF THE DRAWINGS

FIG. 3 depicts a simplified block diagram illustrating some of the functional components of a threat visualization system in accordance with some embodiments.

DETAILED DESCRIPTION

I. Introduction

Figure 1:
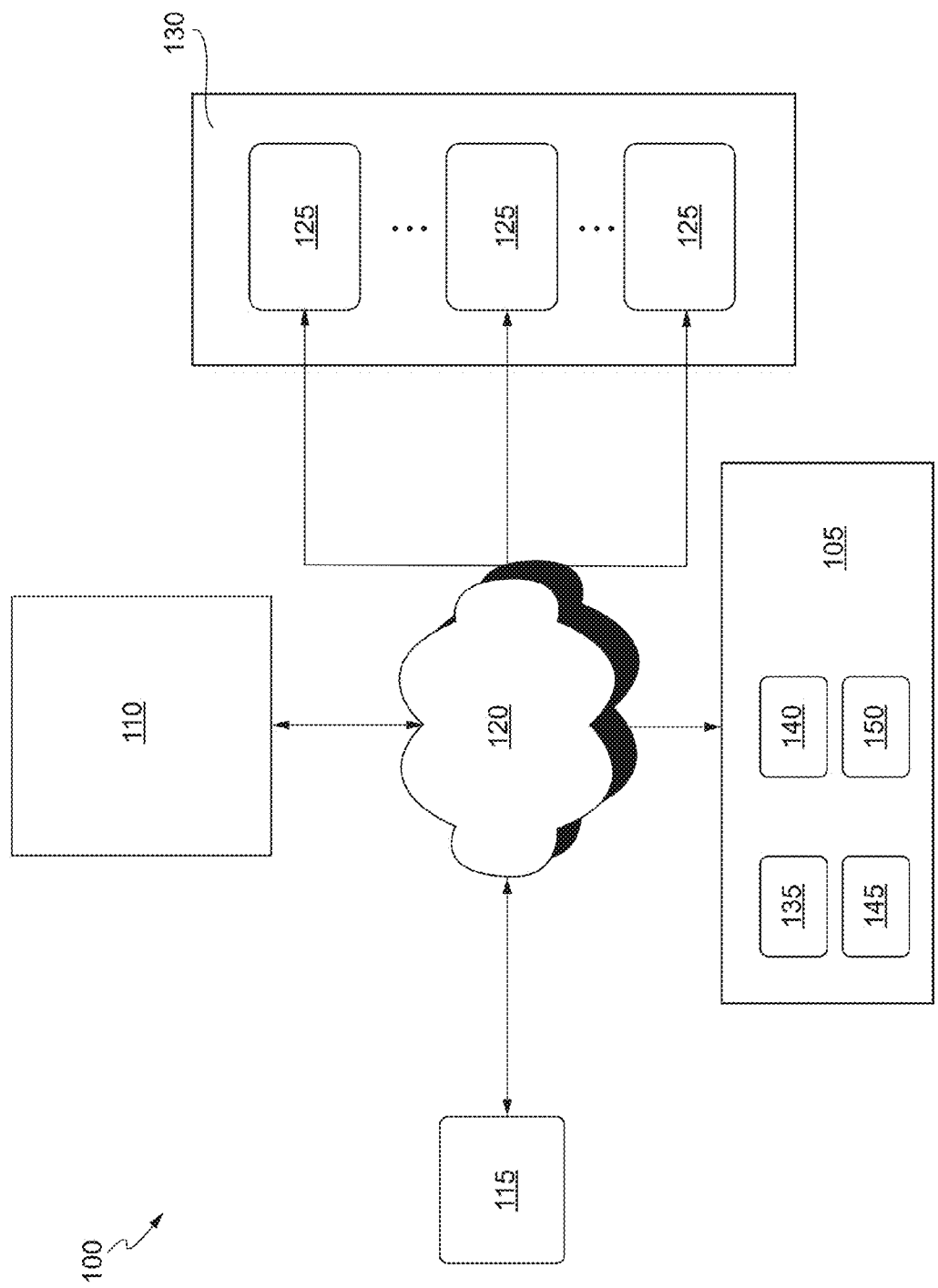
FIG. 1 depicts a simplified block diagram illustrating a high level threat intelligence platform in accordance with some embodiments.

The following disclosure describes a threat intelligence platform that can provide real-time threat detection and analytics. In various embodiments, a system may be provided for that includes: a processor; and a memory storing a set of instructions which when executed by the processor configure the processor to: receive a security event from an agent, the security event including at least a destination and a source; trigger a policy when the security event corresponds to a policy, wherein the policy includes a specification of the source, the destination, and an enforcement action; implement the enforcement action for the security event based on the policy; and update a user interface to link the source and destination of the security event through the triggered policy. However, an entity (e.g., a company, a country) may have thousands or hundreds of thousands of employees and other individuals (e.g., users, consultants, guests) who are constantly accessing various services (e.g., sources) through its network generating security events. As people are attempting to gain access to a wide variety services, there may be various access violations, password errors and such that would necessitate monitoring. Currently, static security rules within security policies are not able to match evolving threats for compromised users, compromised applications, and compromised hosts. Manual or home-grown analysis with user interfaces is cost prohibitive as there is an extremely high volume of user activity (e.g., billions of events per day). Moreover, it is difficult to have automated pattern detection for a large number of users that would be highly accurate and thereby be capable of preventing those unauthorized users from gaining access to services.

To address these problems, various embodiments provide techniques (e.g., systems, methods, computer program products storing code or instructions executable by one or more processors) for analyzing security events using dynamic policies and displaying a consolidated view of active threats and user activity including the dynamic policies being triggered by the active threats and user activity. Some embodiments may track user access and collect information in real-time to identify patterns, produce analytics, and take corrective actions accordingly. By collecting data in real-time or near real-time, corrective actions determined based on the data can be immediately applied. For example, when a user is authenticating against an application, there would only be a short period of time (e.g., milliseconds) until when action(s) would need to be taken to prevent an unauthorized user from gaining access to content. In additional or alternative embodiments, by collecting data in real-time or near real-time and keeping a history of such data, corrective actions determined based on the real-time data and historical data can be applied to prevent the unauthorized user from gaining access even after the user has been authenticated, and take the user out of the network.

Some embodiments provide visibility into the identity of users, resource usage patterns, and performance characteristics. In certain embodiments, the techniques can provide real-time enforcement leveraging certain access controls. For example, certain embodiments may enforce compliance or block users to unsanctioned applications, perform adaptive authorization, challenge users based on policy, and perform content inspection for privacy and leakage. Certain embodiments may provide real-time enforcement using dynamic rules and analytics. Some embodiments may provide a threat visualization that presents real-time data analytics in a manner that is easily understandable to an end user. By digesting a large amount of data and presenting the analyzed data in real-time and in a meaningful way, an end user may identify actionable items and ensure that certain policies are enforced while also ensuring that appropriate policies are updated.

In one example, as a user is in a login page and typing in the username and password and submitting those user credentials, the user credentials are being sent in real-time or near real time to a data collection bus. In some instances, the data can be collected and sent less than every second or 30 milliseconds, depending on a set of tuning parameters (e.g., whether the collection bus is sitting in the cloud, etc.). Aside from the network latency (e.g., when the agent is on a host machine collecting information and the data collector bus is on a different machine such as in the cloud), there is very little delay in the transporting of data (i.e., near real-time). Nonetheless, as the user types in the credentials, the system may determine whether these credentials typically come from a particular server and determines that additional challenges may need to be presented to the user if there is suspicious activity. By the time the user accesses the page, if the system determines that the user should not be authorized despite the credentials being validated, the system will kick the user out of accessing the page.

In some embodiments, a Web proxy can constantly monitor and learn user activity and behavior and trigger an anomaly (thereby cause additional challenges to be presented to the user), after the user logs into an account. For example, the user may try to transfer a large sum of money. This action may trigger the system to present the user with additional challenges. In certain embodiments, the proxy may provide another source of information (e.g., traffic flow) and the collected data is fed and analyzed in real time. When a user is accessing a protected application or a cloud application that is not protected by an agent, the proxy server can determine the user's activity e.g., that the user is going to a certain website to download information. The proxy server can monitor the user activity and provide information that the user is blacklisted because of the collected data. Further, the proxy may provide historical information such that when the user is accessing a new site, the historical information pertaining to the user can be taken into consideration when granting access to the user.

Some embodiments can feed the real time data as it becomes available to a real time visualization server and present the analytics to a customer in real time. As the data is provided to the customer in real time, an action may be determined quickly and responsive to those real time analytics. Some embodiments may store the data and use the stored or historical data to come up with additional rules and policies that can be applied in real time. By mining historical data, certain embodiments may produce enforcement policies based on the historical data. Certain embodiments may use both historical data and analytics that is computed in real time and trigger an anomaly accordingly. Advantageously, these approaches are capable of collecting, monitoring, visualizing, and taking action on very large volumes of security data in real-time (i.e., billions of streaming events).

II. System Architecture for Threat Detection

FIG. 1 depicts aspects of a system 100 for detecting threats in real-time based on detecting anomalous access requests from users, in accordance with at least one embodiment of the present disclosure. In some embodiments, the system 100 includes an access management and threat detection system 105 and an information management system 110 communicatively connected to a user device 115 via a network 120 in a distributed environment. The access management and threat detection system 105 and an information management system 110 are part of an identity access manager. There are different types of agents as part of the identity access manager and the agents protect access for web servers or applications. For example, when a user is trying to access an email server or a document server, there may be a protection agent that communicates with a server (e.g., Oracle Access Manager (OAM server)). The agent will validate whether the user can access this server, for example, by validating the credentials associated with an ID. Certain embodiments may have enhanced agents and access manager servers such that when a user is requesting the data, information on who is accessing what, is sent out to a data collection engine of the information management system 110 in real-time.

Network 120 may facilitate communications and exchange of data between user device 115, access management and threat detection system 105, and information management system 110. Network 120 may be any type of network familiar to those skilled in the art that can support data communications using any of a variety of commercially-available protocols, including without limitation TCP/IP, SNA, IPX, AppleTalk, and the like. Merely by way of example, network 115 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

User device 110 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, user device 110 may be any other electronic device, such as a thin-client computer, Internet-enabled gaming system, and/or personal messaging device, capable of communicating over a network (e.g., network 115). Although exemplary system environment 100 is shown with one user device, any number of user and/or client computing devices may be supported, in other embodiments.

Access management and threat detection system 105 may comprise one or more computers and/or servers, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up access management and threat detection system 105 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, the access management and threat detection system 105 may comprise one or more components operable to protect resources 125 provided by one or more target systems 130 of an organization. In some embodiments, a 'target system' may refer to any system that provides or comprises one or more resources. Resources 125 to which access is provided, either locally or remotely, by a target system 130 may be of various types including software products, applications (e.g., cloud-based applications, enterprise applications, or any other applications), cloud services, various types of data (e.g., networked files, directory information, databases, or the like), and other resources. A target system 130 may include one or more databases, lightweight directory access protocol (LDAP) servers, Active Directory (AD) systems, Email Systems, UNIX systems and the like. For example, a target system 130 may be an Active Directory (AD) system that provides access to active directory services to access an Active Directory server. In some examples, a target system 130 may be a computing system that provides access to a meeting room, such as access to the meeting room using a badge. In some embodiments, a target system 130 may also be referred to as an application instance.

In certain embodiments, access to resources 125 provided by a target system 130 may be controlled using various types of accounts in the target system 130. An account may be provisioned in a target system 130 based upon the resources 125 provided by the target system 130. An account may be of various types such as user accounts, administrative accounts, application accounts, and the like, with each account type providing a particular level of access to one or more resources 125 provided by the target system 130. Separate accounts (e.g., user accounts, administrative accounts, and/or application accounts) may be provided in a target system 130 to enable a user to access or otherwise log into the target system 130. An account may be created, or provisioned, to a user or a group of users (e.g., an organization) based on the identity of the user or the group of users. A user or a group of users may be provided with a particular account type to access a particular resource type. For instance, an e-mail account on an Exchange server provided to a user may be an account of a resource type Exchange. A user may be given multiple accounts, each corresponding to an account type for a resource type. For example, a user may have two different accounts for logging into a target system 130 to perform different types of operations. For example, a target system 130 may host an Email exchange server and provide an email account type. The same target system 130 may also host an human resource (HR) system and provide an HR administrator account type for performing administrative functions related to the HR system. A particular user may have an email account on the target system 130 and also have an HR administrative account on the target system 130. When logged in using the email account, the user may access emails. When logged in using the HR administrative account, the user can perform administrative tasks related to managing resources in an organization.

In accordance with at least some embodiments, a user on a user device 115 may communicate with a target system 130 to request for a resource 125 (e.g., an email application) by accessing a web-based request user interface (UI) on user device 115. For example, request UI may include a graphical user interface viewable via a client application (e.g., a browser) on the user's device 115. When a user wishes to access a resource on a target system 130 or attempt to perform an operation on a resource on target system 130, access management and threat detection system 105 may intercept the access request from the user, and attempt to first authenticate/authorize the user. For example, the access management and threat detection system 105 may provide the user with a log-in page to obtain the user's credentials (e.g., log-in identifier and password). The access management and threat detection system 105 may then be configured to determine if the user is an authorized user based on the user's login credentials. The access management and threat detection system 105 may be configured to receive various types of access requests such as web requests, SDK requests, programmatic requests, and the like for various events/operations (e.g., authN, authZ, policy checks, stepup authN, sso, token issuance) via various channels (HTTP, OAP) from the users.

In various embodiments, the access management and threat detection system 105 includes one or more agents 135, one or more proxies 140 (e.g., forward or reverse proxies), one or more access managers 145, and/or one or more Webgates 150. The access management and threat detection system 105 may be implemented in system 100 according to an agent-server model for enabling communication between user device 115 and target system 130 (e.g., a distributed environment server) to provide access control functionality over resource 125. The agent-server model may include an agent component (e.g., the one or more agents 135, one or more proxies 140, and/or one or more Webgates 150 also known as a single sign-on agent or policy-enforcement agent) and a server component (e.g., one or more access managers 145 also known as a single sign-on server or policy server). For example, the one or more access managers 145 may serve as the decision component for controlling access to the resource 125, and the one or more agents 135, one or more proxies 140, and/or one or more Webgates 150 may implement or operate as the enforcement component for controlling access to the resource 125. In some embodiments, the one or more agents 135, one or more proxies 140, and/or one or more Webgates 150 may be deployed with the resource 125 as a plugin or as a portion of the resource 125, or the one or more agents 135, one or more proxies 140, or one or more Webgates 150 may be provisioned separate from the resource 125, for example, running on a web server in front of the resource 125. The one or more access managers 145 may be deployed as a part of the identity access manager.

The access management and threat detection system 105 enables SSO functionality within a distributed environment, and may perform various access control related functions for managing access to resources within the distributed environment. For example, the one or more agents 135, one or more proxies 140, one or more access managers 145, and/or one or more Webgates 150 may perform authentication of a user operating a user device 115. Authentication is a process by which a user is verified to determine that he/she is who he/she claims to be. To authenticate a user, access management and threat detection system 105 may present a user with a request for authentication credentials in the form of a challenge (e.g., via the user's web browser). Enforcement policies (e.g., authentication policies) may specify the authentication methodology to be used for authenticating the user for whom the access must be provided on a given resource. The policies define the way in which the resource access is to be protected (e.g., type of encryption, or the like). The one or more access managers 145 may determine authorization of a user to access a resource 125. Authorization is the process of determining if a user has a right to access a requested resource. Enforcement policies (e.g., authorization policies) may be defined that specify the conditions under which a user or group of users has access to a resource. For example, an administrator may only authorize certain users within a group to access particular resources.

The one or more agents 135 may be policy enforcement agents that act as a filter for resource requests. The one or more agents 135 may intercept resource requests and apply static and dynamic enforcement policies to determine whether the requested resources are protected by the access management and threat detection system 105. If so, the resource request may be forwarded to one or more access managers 145 to determine whether the user requesting the protected resource may access the protected resource. In certain embodiments, one or more Webgates 150, an out of the box solution developed by Oracle International Corporation, may be used as an agent so that it can filter the resource requests. It should be noted that the one or more agents 135 and one or more Webgates 150 may be a hardware structure or a combination of hardware and software implementations, in accordance with some embodiments.

The one or more proxies 140 may be policy enforcement agents that act as a filter for resource requests. For example, the one or more proxies 140 may be authentication proxies that handle user authentication for resources. The authentication proxies may be called (e.g., instantiated) by a web application or the resources to provide authentication capabilities. In some embodiments, the authentication proxies may include a high-level API that integrates one or more low-level authentication schemes to allow for programs that rely on authentication to be designed and written independently of an underlying authentication scheme. The one or more proxies 140 may intercept resource requests and apply astatic and dynamic enforcement policies to determine whether the requested resources are protected by the access management and threat detection system 105. If so, the resource request may be forwarded to one or more access managers 145 to determine whether the client requesting the protected resource may access the protected resource. An example of such an authentication proxy is a pluggable authentication module (PAM) used in Linux systems. It should be noted that the one or more proxies 140 may be a hardware structure or a combination of hardware and software implementations, in accordance with some embodiments.

The one or more access managers 145 may have multiple components for authentication and/or authorization processes. Additionally, the one or more access managers 145 may include one or more authentication schemes. The authentication schemes may be configured to protect the resources using one or more access policies (e.g., static and dynamic enforcement policies as discussed herein). The authentication schemes may include details about a credential collection mechanism and type of credential collector used to collect credentials. For example, credential collection may occur using an HTTP(S) transport channel that is handling HTTP(S) request from a remote user. In certain embodiments, the authentication schemes may identify a redirect URL (Uniform Resource Locator), which is used to notify the user device 115 of the success or failure of the authentication and/or authorization processes. In addition, the authentication scheme may identify an authentication level indicating the trust level to protect transport of credentials from the user device 115. For example, an LDAP (Lightweight Directory Access Protocol) scheme may be at authentication level 2 with an LDAP authentication module to protect Manager-related resource, e.g., URLs, based on a form challenge method. In the form challenge method, an HTML form with one or more text input fields may be used to gather credential information. In some embodiments, the form-based challenge may collect credentials such as username and password, social security number, date of birth, one time password, or a combination of other common parameters.

FIG. 1 further illustrates an example of a SSO session managed within a distributed environment implementing the access management and threat detection system 105 including the one or more agents 135, one or more proxies 140, one or more access managers 145, and/or one or more Webgates 150. For example, a user may operate user device 115 to request access to resource 125 controlled by target system 130. The request may be routed to or intercepted by the one or more agents 135, one or more proxies 140, and/or one or more Webgates 150, which controls access to resource 125. In some embodiments, some resources managed by the one or more agents 135, one or more proxies 140, and/or one or more Webgates 150 may not protected, in which case the one or more agents 135, one or more proxies 140, and/or one or more Webgates 150 may query the one or more access managers 145 to determine if the requested resource is protected. The one or more access managers 145 checks relevant enforcement policies for the resource 125 to determine whether authentication is required for access to the resource 125. If the requested resource 125 is protected and requires authentication for use, the one or more access managers 145 may determine whether any session exists for the user. Upon determining that no session has been established for the user, the user may be forwarded by the one or more access managers 145 to a login service (e.g., an authentication service) of the identity access manager. The authentication service may request authentication credentials (e.g., user name/password, or the like) from the user. The authentication service may authenticate the user upon receiving the proper authentication credentials by validating the credentials against those stored in a user directory or identity store.

Based on receiving the proper authentication credentials for the user, the one or more access managers 145 may forward the user back to the one or more agents 135, one or more proxies 140, and/or one or more Webgates 150, the one or more agents 135, one or more proxies 140, and/or one or more Webgates 150 may check the authentication, and establish a first session for the user upon authentication of the user. As a result, the user is logged into the target system 130 (e.g., a distributed environment server) for the session. Once logged in, the user may access resources to which the user is authorized to access, such as running different applications, accessing cloud storage, or the like. Once the user is logged into the target system 130, the one or more access managers 145 may create a cookie that tracks session activity for user. The cookie may include a length of time that the user has been active on a session. The cookie may be stored as session activity data within the information management system 110.

Upon determining that user is authenticated for a SSO session, the one or more agents 135, one or more proxies 140, and/or one or more Webgates 150 may process the original request for resource 125 by directing an authorization query to the one or more access managers 145. The one or more access managers 145 checks relevant enforcement policies for the resource 125 to determine whether the user is authorized to access to the resource 125. The one or more access managers 145 responds to the one or more agents 135, one or more proxies 140, and/or one or more Webgates 150 with an allow or deny message based on the enforcement policies. Upon determining that the user is allowed access to the resource 125, the one or more agents 135, one or more proxies 140, and/or one or more Webgates 150 allow the request from the user device 115 for access to the resource 125 to go through and the user can access the resource 125 on the target system 130 via user device 115. Upon determining that the user is denied access to the resource 125, the one or more agents 135, one or more proxies 140, and/or one or more Webgates 150 notifies the user device 115 that access to the resource 125 for the user is not permitted.

Information management system 110 may comprise one or more computers and/or servers, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up information management system 110 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, the information management system 110 is responsible for supporting the access management and threat detection system 105 to protect and authorize user access to resources 125. The information management system 110 may be configured to obtain additional information associated with a user's access request in order to authenticate/authorize the user's access into the target system 130. This information may include, for instance, the client IP address from where the request originated, device information, user information, resource being requested, time of request, and so on. The information management system 110 may be further configured to analyze the information to create and publish new policies (e.g., dynamic inspection and enforcement policies) that overwrite static policies for a predetermined period of time. In some embodiments, as the real-time data becomes available it is presented visually as a part of system threat analytics to a customer. As the data is provided to the customer in real-time, an action may be determined quickly and responsive to those real-time threat analytics. Various embodiments may store the data and use the stored data (i.e., historical data) to generate additional rules or policies that can be applied in real-time. By mining historical data, certain embodiments may produce dynamic inspection and enforcement policies based on the historical data. In other embodiments, both the historical data and analytics from the analyzed information that is computed in real-time are used to produce dynamic inspection and enforcement policies.

Figure 2:
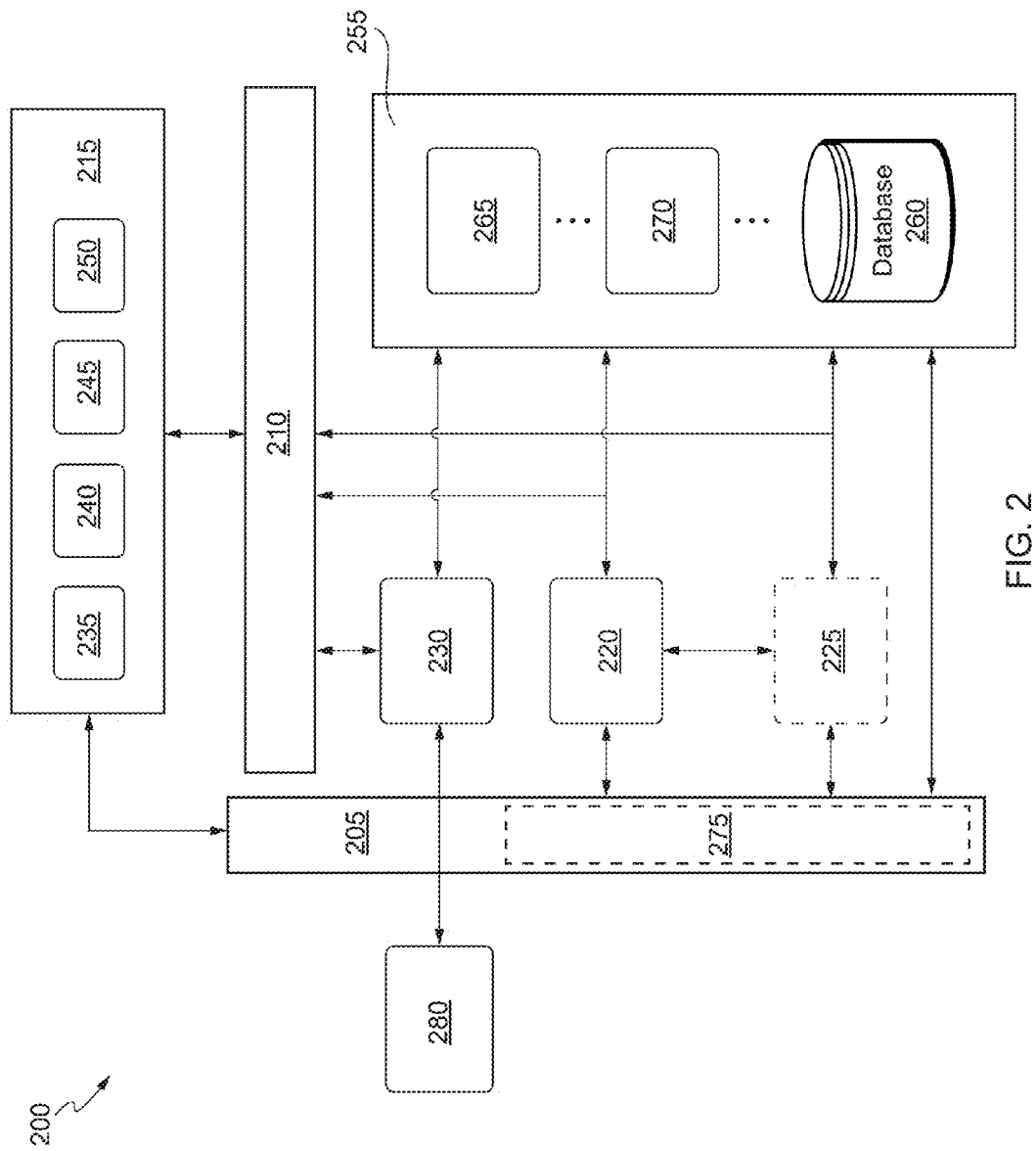
FIG. 2 depicts a simplified block diagram illustrating a detailed architecture of an information management system in accordance with some embodiments.

FIG. 2 depicts aspects of an information management system 200 (e.g., the information management system 110 as discussed with respect to FIG. 1) for collecting information regarding user access to resources, publishing policies based on analytics of the information, and visualizing the analytics of the information. In some embodiments, the information management system 200 includes a collection bus 205 and a policy bus 210 communicatively connected via a network (i.e., network 120 as discussed with respect to FIG. 1) to access management and threat detection system 215 (e.g., the access management and threat detection system 105 as discussed with respect to FIG. 2). The information management system 200 may further include the collection bus 205 and the policy bus 210 communicatively connected to an analytics server 220, a machine learning component 225, a visualization server 230, the one or more agents 235, the one or more proxies 240, the one or more access managers 245, the one or more Webgates 250, and system memory 255.

The collection bus 205 and policy bus 210 include a network topology in which nodes such as the analytics server 220, the machine learning component 225, the visualization server 230, the one or more agents 235, the one or more proxies 240, the one or more access managers 245, and/or the one or more Webgates 250 are connected to a common linear (or branched) link called a bus or enterprise service bus. The collection bus 205 and policy bus 210 implement a software architecture for distributed computing that include routing messages and data between the various nodes, controlling deployment of various policies (inspection and enforcement policies), and providing services such as facilitating the collection of data based on inspection policies and publishing the various policies (inspection and enforcement policies) to listeners (i.e., the agents).

The an analytics server 220, machine learning component 225, and visualization server 230 may comprise one or more computers and/or servers, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up analytics server 220, machine learning component 225, and visualization server 230 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

The system memory 255 may be one or more storage mediums, including for example, non-transitory machine readable storage medium such as flash memory, permanent memory such as read-only memory ("ROM"), semi-permanent memory such as random access memory ("RAM"), any other suitable type of non-transitory storage component, or any combination thereof. The memory 255 provides for storage of computer readable program instructions, data structures, program modules and other data for operation of the system 200 in accordance with the different aspects. In embodiments, memory 255 may store an operating system, application programs, the policies, data such as information related to a user's activity and access requests, and program data in accordance with certain aspects.

With the system of FIG. 2 deployed, the access management and threat detection system 105 (enabled by one or more agents 235, one or more proxies 240, one or more access managers 245, and/or one or more Webgates 250, as discussed with respect to FIG. 1) can make informed decisions based on rules within static and dynamic enforcement policies about whether an end user is authenticated and/or authorized to access resources on a target system. The rules may include a specification of a destination (e.g., URI, host name, destination IP address or port, etc. of a target system or resource such as an application or service), a source (e.g., a user ID, designation for a group of users, an IP address for a client device, etc.), a time duration (e.g., a predetermined time that the policy is in effect), and an enforcement action (e.g., block a user from accessing, request authentication/authorization factors, monitor activity, etc.), and when network traffic or a user activity pattern corresponding to the rules in a policy, the policy is triggered and the enforcement action is applied. The static and dynamic enforcement policies may be stored in the memory 255 as a cache of static policies 265 and a cache of dynamic policies 270.

In certain embodiments, the general method proceeds as follows. An end user enters a URL or an identification of a requested resource residing in a protected policy domain. The user's browser sends the URL as part of an HTTP request to a Web Server. The one or more agents 235, one or more proxies 240, and/or one or more Webgates 250 recognize and intercept the request. If the end user has not already been authenticated, the one or more agents 235, one or more proxies 240, and/or one or more Webgates 250 causes the Web Server to issue a challenge to the browser for log-in information. The received log-in information is then passed back to the Web Server and on to the one or more agents 235, one or more proxies 240, and/or one or more Webgates 250. The one or more agents 235, one or more proxies 240, and/or one or more Webgates 250 in turn makes an authentication request to the one or more access managers 245, which determines whether the user's supplied log-in information is authentic or not. The one or more access managers 245 performs the authentication by accessing attributes of the user's identity profile and the resource's authentication criteria stored in memory 255. If the user's supplied log-in information satisfies the authentication criteria, the process flows as described below; otherwise, the end user is notified that access to the requested resource is denied and the process halts.

After authenticating the user, the one or more agents 235, one or more proxies 240, and/or one or more Webgates 250 queries the one or more access managers 245 about whether the user is authorized to access the resource requested. The one or more access managers 245 in turn queries information management system 200 for the appropriate authorization criteria for the requested resource. The one or more access managers 245 retrieves the authorization criteria for the resource and answers the one or more agents 235, one or more proxies 240, and/or one or more Webgates 250 authorization query, based on the resource's authorization criteria and the user's identity profile. If the user is authorized, the user is granted access to the resource; otherwise, the user's request is denied. Various alternatives to the above described flow are also within the spirit and scope of the present invention.

The authentication and authorization decisions may be made based on policy domains and policies (e.g., static and dynamic enforcement policies). A policy domain is a logical grouping including Web Server host ID's, host names, URL prefixes, and rules. Host names and URL prefixes specify the course-grain portion of the web name space a given policy domain protects. Rules of the policy domain specify the conditions in which access to requested resources is allowed or denied, and to which end users these conditions apply. Policy domains may comprise two levels of rules: first level default rules and second level rules contained in policies. The first level default rules may apply to any resource in a policy domain not associated with a policy. The second level rules may apply to any resource in a policy domain associated with a policy. A policy is a grouping including a URL pattern, resource type, operation type (such as a request method), and rules that restrict access to particular resources by user, static or dynamic group memberships, time of the day or week, IP (Internet Protocol) addresses, etc. A policy may be static or dynamic, attached to a policy domain, and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

The static and dynamic enforcement policies are statements that bring together attributes to express what is allowed and what is not allowed. The enforcement policies may use any type of attributes (user attributes, resource attributes, object, actions, environment attributes, etc.) and comprise logic such as Boolean logic, in which rules contain statements (e.g., "IF, THEN") to evaluate the attributes and determine what is allowed and is not allowed (e.g., whether the user making the request is authenticated, whether the user making the request is authorized to access the requested resource, whether the user making the request is authorized to take the request action on the requested resource, etc). For example: IF the requestor is a manager, THEN allow read/write access to sensitive data. The static enforcement policies comprise default rules or rules written/rewritten through-out the life span of the system (e.g., created by an administrator of the system) to evaluate evolving dynamics or attributes of the system. However, the rules contained within the static policies are not written/rewritten in real-time such that the policy is capable of evaluating evolving dynamics or attributes of the system in real-time. On the other hand, the dynamic enforcement policies comprise rules written/rewritten (e.g., created by machine learning techniques or an administrator of the system) to evaluate evolving dynamics or attributes of the system in real-time.

In various embodiments, systems and methods for static and dynamic policy provisioning and enforcement are provided based on threat detection. The static and dynamic enforcement policies may be enforced by the various agents (e.g., one or more agents 235, one or more proxies 240, and/or one or more Webgates 250) along the enforcement path and the policies may be interpreted as each applies to the agents' position in the enforcement path. In some embodiments, the dynamic policies can be created manually by an administrator or can be injected automatically by the machine learning component 225 into the system. Certain embodiments may also designate a time period (e.g., a predetermined period of time) in which the dynamic policy should be run. For example, a policy may be set for only a predetermined period of time (e.g., 5 minutes, 10 minutes, 4 hours, 1 day, 2 weeks, etc.) to allow the analytics server 220 and/or administrator to monitor and trigger anomalies based on data in that predetermined period of time. The policy may then expire after the predetermined period of time. As such, some embodiments may monitor the behavior and ensure the stability of the system with the newly added dynamic policy. The dynamic policies can be modified as they are monitored and can become a solid or persistent policy (i.e., not bounded by the predetermined period of time). Using the machine learning capabilities, some embodiments may create a dynamic policy for a predetermined time period (e.g., the next 30 minutes) and eventually have it permanently overwrite the static policies that are configured for the system. As should be understood, it would be inefficient and resource consuming to have a security administrator, who is viewing a visualization application, generate these policies quickly and push them into the system regardless of whether a full approval process is needed.

In some embodiments, a sticky policy (i.e., a static policy that cannot be overwritten) may be created where the policy may not be affected by the machine learning component 225. In other embodiments, the machine learning component 225 can learn about the default policies or policies created by an administrator (e.g., static policies that can be overwritten) and modify the policies or overwrite the policies with dynamic policies. In certain embodiments, the machine learning may cause a default policy or static policy previously configured by a system administrator to change based on additional data, and overwrite the default policy or static policy. For example, an anomaly can be put into a certain category that corresponds to a block policy, which is a high alert policy, that may overwrite another category such as a second factor authentication where even if a user is in a valid session, some action performed by the user may cause a form or a question to be present to the user for an additional layer of authentication. Other embodiments may specify to never create a block policy (e.g., a policy with logic configured to block a user or group of users from an action such as read/write on a resource), so that the administrator can monitor the types of policies the machine learning is triggering. For example, the administrator may for the first few months observe that the machine learning is creating several high alerts under certain circumstances or when there are certain patterns, verify those alerts, and determine that that the machine learning is not creating a high number of false positives. Then, the administrator may adjust the policy and indicate that instead of creating a high alert for this pattern, create a second factor authentication policy for the same pattern.

In one example, a user can be accessing servers (e.g., a target system) every day from 7-9 am from home or another location, and then from 10 am to 4 pm, accessing the servers from work or the headquarters. When the user travels to another location and tries to access the servers, the analytics server 220 may determine that the accessing is an anomaly and thereby trigger a second factor authentication because the system had already configured with a default or static policy for the anomaly to trigger second factor authentication when the location based data does not match the historical data. After a period of time, the system may learn and adapt from the default or static policies and determine that based on user behavior pattern, the system should not trigger an anomaly when the user is traveling to the other location. The system may also differentiate a user behavior pattern. Based on historical data and updated real-time data, the system may determine whether an anomaly should be triggered intelligently. The machine learning component 225 can be constantly learning from historical data and real-time data to create and modify the end user identity profiles or models of behavior and the polices governing the behavior. Instead of updating the identity profiles and policies every week or every other week, these identity profiles and policies are updated in real-time such that the following anomaly detections have taken all historical data and real-time data of the user's activity into account. This enables something that might have been identified as an anomaly to be taken into account promptly for the next determination. So in this example, the new location has already been updated in the memory 255 such that the next time the user logs in while the user is in this geographic location, the activity on the system doesn't cause the anomaly detection to be triggered. In essence, a new dynamic policy has been created that overwrites the previous policy.

FIG. 2 further illustrates a mechanism for event/data collection. In some embodiments, machine learning component 225 can be more successful in generating enforcement policies if the machine learning has more data to process and can find increased numbers and complexity of patterns. In certain embodiments, the event/data collection is dynamic and an inspection policy mechanism can facilitate the collection of data. The collected data can be linked to machine learning, which will then create more enforcement policies or trigger anomalies triggered by the enforcement policies. For example, when onboarding a new application, the system may activate (automatically via the collection bus 205 and the analytics server 220 or manually via an administrator) an inspection policy to understand how the application works. The inspection policy may generate data by examining user activity with the application in consideration of the rules of the inspection policy. The collection bus 205, the analytics server 220, and the machine learning component 225 may automatically categorize the activity based on the collected data, and determine that the activity is a low, medium, or high alert activity based on a pattern identified within the data. Thereafter, the analytics server 220 and the machine learning component 225 may automatically generate dynamic inspection and enforcement policies based on the data collected by the collection bus 205, which can be published on the policy bus 210 and used by agents to overwrite static policies for a predetermined period of time.

In certain embodiments, anything that is published in the enterprise (e.g., on a network of the enterprise) may be available in the real-time data collection via the collection bus 205 and consumed and analyzed by the analytics server 220. In some embodiments, the analytics server 220 can perform event correlation and generate reports and publish the reports on a report bus 275. The report bus 275 is the bus from which the machine learning component 225 continuously receives the information in real time and then provides the information via visualization server 230 through a user interface. The machine learning component 225 is also consuming the real-time events as well as historical data from the collection bus 205, the memory 255, and the report bus 275. Accordingly, the machine learning component 225 can find anomalies and publish a policy (inspection or enforcement) into the policy bus 210.

In conventional techniques, agents may be configured to collect data, log the data as log ascii data name value pairs, and send the log periodically (e.g., every 5 minutes or 10 minutes) to a server. As the agents may be in the cloud, while the server is in the enterprise or the other way around, the shipping of these logs may be expensive. Moreover, by accumulating the logs and sending them altogether, it is time consuming. Instead of collecting and sending log ascii data name value pairs, various embodiments operate in real-time by using binary data to transport the data from the various agents to the collection bus 205 so the data is highly compressed. Certain embodiments may send the values and the mechanisms to map the data. For example, values may be sent from an agent to the collection bus 205, and the collection bus 205 will determine what kind of format is being sent from the agent (e.g., Schema 1). Once the format is identified, the values can be interpreted. This is a compressed and efficient way of transporting data.

In various embodiments, to detect and trigger a threat, the system may rely on data captured and sent by the agent(s) including one or more agents 235, one or more proxies 240, one or more access managers 245, and/or one or more Webgates 250. A predefined set of attributes (e.g., user attributes, resource attributes, object, actions, environment attributes, etc.) may not suffice when the agent(s) have to support newer target systems, application(s), and change in existing application interfaces. Accordingly, the use of dynamic inspection policies may allow the system to send dynamic rules requesting agents to collect/inspect additional information or attributes such as data in various payloads (e.g., HTTP). This information may then be reported as part of the regular access request event. The machine learning component 225 can then detect anomalies on this new set of data or information, and insert a dynamic enforcement policy, which may then trigger more anomalies. As more anomalies are triggered, additional enforcement policies may be created to prevent particular types of traffic, thus completing the collection, detection, and enforcement cycle.

The collection bus 205 may be configured to obtain the information associated with a security event such as an end user's access request and report the information or data on the report bus 275. The configuration of the collection bus 205 may be based on default or static inspection policies comprising rules for collecting a predefined set of attributes (e.g., user attributes, resource attributes, object, actions, environment attributes, etc.) when certain criteria is satisfied. In certain embodiments, an inspection policy monitors data and informs an administrator when a certain criteria match a predefined pattern. The inspection policy does not cause an alert to be triggered when the pattern exists but collects the predefined set of attributes when the pattern exists. For example, the system may provide an inspection policy user interface (UI) that allows an administrator to designate the triggering of certain inspection policies when a set of criteria has been met (e.g., if header data matches, for a threshold time interval). In accordance with other aspects, the configuration of the collection may be based on dynamic inspection policies comprising rules for collecting the data or attributes. For example, the collection bus 205 and the analytics server 220 may work together to collect the predefined set of attributes and trigger anomalies based on rules that were previously configured (default, static, or dynamic inspection and enforcement policies). The inspection policies can designate the predefined set of attributes to be collected and the criteria for the patterns in the data to be identified. Once the attributes and patterns are collected via the collection bus 205, the analytics server 220 may inspect the attributes and patterns in the data and determine whether the attributes and patterns match any rules defined within the enforcement policies. Once the data comes into the collection bus 205, it may be stored in memory 255 and becomes part of historical data. The machine learning component 225 can be constantly learning from the historical data and real-time data to create and modify the inspection and enforcement policies to efficiently collect information required for threat assessment of user activity on the system.

The information associated with an event may be collected from one or more agents including the one or more agents 235, one or more proxies 240, one or more access managers 245, and/or one or more Webgates 250 (as discussed with respect to FIG. 1), and include, for example, the client IP address from where the request originated, device information, user information, resource being requested, time of request, and so on. In certain embodiments, the information is additionally collected from third party agents including GPS applications within the client device, weather applications, monitoring software, hardware sensors, load balancing software, etc. The information may be collected by the collection bus 205 in an asynchronous manner. For example, the collection bus 205 may include a queue configured to process the information, index the information in real-time, and perform data aggregation and query operations on the information. In some examples, the collection bus 205 may be configured to organize the information related to an access request received from a user into various categories such as the client context, the resource context, the user context, server context, timestamps, session information, the server instance processing the request, and so on. In various embodiments, the collection bus 205 is configured to store the information or data obtained and organized from user activity in an information database 260 of a memory 255.

FIG. 2 further illustrates a mechanism for creating dynamic enforcement polices based on the event/data collection, and publishing the dynamic enforcement polices for consumption by the agents (e.g., one or more agents including the one or more agents 235, one or more proxies 240, one or more access managers 245, and/or one or more Webgates 250) via the policy bus 210. In some embodiments, the analytics server 220 and machine learning component 225 are configured to create dynamic enforcement policies for a user or group of users by analyzing the incoming real-time data and the historical data regarding access requests received from the user or group of users (e.g., stored in memory 255) over a period of time. In one embodiment, the analytics server 220 and machine learning component 225 may be configured to generate dynamic enforcement policies for a user or group of users by identifying a subset of parameters associated with incoming real-time data and the historical data of access requests for the user or group of users and analyze the incoming real-time data and the historical data of access requests against the subset of parameters to create dynamic enforcement policies. For example, the analytics server 220 and machine learning component 225 may be configured to analyze a user or group of users' access requests based on a time parameter (e.g., the time) at which the user or group of users normally accesses one or more applications stored on the target system and create an enforcement policy based on monitoring the time of access from the user, over a period of time. The enforcement policy may include rules where if the user or group of users tries to access the one or more applications outside of the normal time parameter, then a second factor authentication may be requested or a block may be placed on the user or group of users.

In some embodiments, the subset of parameters to be monitored may be identified/defined by a resource (e.g., a target application) on the target system that the user generally accesses and the target application may provide this information to the analytics server 220. For instance, the target application (e.g., a financial application) might want to track a user's access requests based on parameters such as the user id, the time of access, the duration of access, and so on. These parameters are configured with the analytics server 220, and the machine learning component 225 may then create an enforcement policy for a user or group of users by analyzing the incoming real-time data and the historical data of access requests over a period of time, against these parameters. In certain embodiments, in instances where data is not being collected to satisfy the subset of parameters to be monitored, the analytics server 220 and the machine learning component 225 mare configured to create a dynamic inspection policy that is triggered to obtain such data to satisfy the subset of parameters upon certain criteria being satisfied (e.g., the user or group of users logging into the system).

In certain embodiments, the analytics server 220 and machine learning component 225 may be configured to generate multiple policies for the user or group of users. These policies may be generated by analyzing incoming real-time data and the historical data of access requests for a user or group of users against different sets of parameters associated with the access requests. For example, as noted above, the analytics server 220 and machine learning component 225 may be configured to generate a time based policy for a user or group of users by analyzing the user's or group of users' access requests based on the time at which the user or group of users normally accesses various applications stored on the target system. In another instance, the analytics server 220 and machine learning component 225 may be configured to generate an application access pattern policy for the user by analyzing a pattern in which a user accesses various applications stored on the target system. The analytics server 220 and machine learning component 225 may be configured to generate a policy for the user by capturing the characteristics of security threats, intrusion, Denial Of Service (DOS) attacks from the access requests.

In some embodiments, the analytics server 220 and machine learning component 225 may be configured to generate a policy by classifying the incoming real-time data and the historical data of access requests associated with a user or group of users into one or more data clusters. In certain embodiments, the analytics server 220 and machine learning component 225 may be configured to generate the one or more data clusters using supervised or unsupervised machine learning or other clustering (e.g., K-means) techniques. In various embodiments, the machine learning component 225 may be configured to use unsupervised learning using a density based clustering algorithm and Euclidian distance to calculate the distance of the access request from the centroid of the cluster. In certain examples, the radius of the cluster is calculated based on the mean of the distance from centroid of each point in the cluster. Any point falling outside the radius will have higher risk based on the standard deviation. The closer user activity on the enterprise network is to the centroid, the lower is the risk for that access.

The incoming real-time data and the historical data values for parameters configured by the analytics server 220, the machine learning component 225, and/or the integrating application (e.g., the application that the user is requesting access to) can, in certain examples, become data points for building the cluster. Once the cluster is established, the analytics server 220 and machine learning component 225 may be configured to generate a policy that includes rules regarding the one or more data clusters. For example, a rule may be established that states: if certain parameters (x, y, and z) of a request from a user or group of users does not match parameters (x, y, and z) of the cluster then an action may be taken, e.g., a second factor authentication may be requested or a block may be placed on the user or group of users. Consequently, when a new request is received from the user or the group of users, the values of the parameters from the request are matched against the rules in the policy including the already established parameters of the cluster to determine if the access request from the user or group of users is anomalous.

In some embodiments, once the cluster is established, the analytics server 220 and machine learning component 225 may be further configured to categorize the policy based on threat levels. The threat levels may be determined based on the distance calculated from the center of a cluster. As an example, a traffic pattern on the enterprise network can have attributes that are used to generate a policy with rules set on criteria such as a distance of the traffic pattern from one or more clusters. If the distance is one time (e.g., one standard deviation from the mean), then the policy may be classified as a low risk and associated traffic patterns may trigger a low alert. If the distance is two times (e.g., two standard deviation from the mean), then the policy may be classified as a medium risk and associated traffic patterns may trigger a medium alert. If the distance is greater than three times (e.g., greater than three standard deviation from the mean), then the policy may be classified as a block and associated traffic patterns may trigger a block on such activity. Accordingly, the customer need not worry about whether it is an unusual pattern in the traffic pattern. Instead, the customer can be more focused on whether the traffic pattern created a low alert, a medium alert, a high alert, second factor authentication, or a block.

As described herein, a policy can be generated by the analytics server 220 and machine learning component 225, or an administrator (by a person seeing that an anomaly has arisen). Some embodiments use Structured Threat Information eXpression (STIX) as the standard in how the policy is declared. In various embodiments, once a policy (e.g., a new dynamic enforcement policy) is established or generated, the policy is published to the policy bus 210 for consumption by the agents (e.g., the one or more agents 235, one or more proxies 240, one or more access managers 245, and/or one or more Webgates 250) in order to enforce the policy. When the policy is being consumed by the agents, the agents all become a part of an enforcement ecosystem. For example, when a new access request is received from a user or group of users, the one or more agents 235, one or more proxies 240, one or more access managers 245, and/or one or more Webgates 250 are configured to analyze the information associated with the access request against an enforcement policy (default, static, or dynamic) to determine if the user's or group of users' access request is anomalous.

In some embodiments, the one or more agents 235, one or more proxies 240, one or more access managers 245, and/or one or more Webgates 250 may be configured to first select a policy for the user or group of users from a plurality of enforcement policies that are published on the policy bus 210. In certain embodiments, the policy may be specifically associated with the user or group of users. The selection may be based on, for example, the type of application that the user or group of users is requesting access to. For instance, if the user or group of users is requesting access to a financial application on the target system, the one or more agents 235, one or more proxies 240, one or more access managers 245, and/or one or more Webgates 250 may be configured to select a policy from the plurality of policies that analyzes a subset of parameters defined by the financial application. For example, and as noted above, a financial application might want to analyze access requests from a user or group of users based on parameters such as the user id, the time of access, the duration of access, and so on. In other embodiments, the one or more agents 235, one or more proxies 240, one or more access managers 245, and/or one or more Webgates 250 may be configured to obtain all of the plurality of enforcement published on the policy bus 210, and analyze access requests from a user or group of users based on parameters from all or a subset of the policies.

Once the one or more agents 235, one or more proxies 240, one or more access managers 245, and/or one or more Webgates 250 has selected or obtained a particular policy, they may be configured to analyze the information associated with the access request against the policy and determine if the user's access request is anomalous. In some embodiments, the one or more agents 235, one or more proxies 240, one or more access managers 245, and/or one or more Webgates 250 may be configured to determine an anomalous request by determining deviation of the access request from the one or more data clusters generated by the analytics server 220 and machine learning component 225. If the deviation is beyond a predetermined threshold value, the request is determined to be anomalous. The threshold value can be determined by a user (e.g., an administrator) of system, or automatically by the analytics server 220 and machine learning component 225. In certain embodiments, the threshold value may be a mahalanobis distance that takes into account correlations of the data set for a cluster.

Each agent can react to a published policy in its own way to achieve the same end goal (e.g., not granting an unauthorized/unauthenticated user access to a protected resource). In certain embodiments, when an anomaly is detected and a policy to block a user is instituted (e.g., in STIX format) and published onto the policy bus 210, the one or more agents 235, one or more proxies 240, one or more access managers 245, and/or one or more Webgates 250 may select or obtain the policy and determine its role in blocking the user or group of users. For example, when the user or group of users is accessing an application, the one or more access managers 245 can be the entity that validates a user's credentials and authenticates the user to be part of an authenticated session, while the one or more agents 235, one or more proxies 240, and/or one or more Webgates 250 can initiate, maintain, or drop the session such that whenever a user is accessing a resource within any part of the enforcement ecosystem, the user may be challenged and validated. The one or more proxies 240 may constantly monitor and learn a user's or groups of users' activity as it is happening, and trigger an anomaly and take action such as a block on activity based on the policy. For instance, the one or more proxies 240 may obtain information of which user to block from a policy, and when a session request is received from an IP address that corresponds to the user, the one or more proxies 240 could block the initiating of the session. Thus, even if a resource is not protected by the other agents, the one or more proxies 240 have the same policy from the policy bus 210 and can take independent action on user activity.

Additionally or alternatively, the one or more agents 235, one or more access managers 245, and/or one or more Webgates 250 may constantly monitor and learn a user's or groups of users' activity as it is happening (e.g., when a user tries to type in a username or password on a login page, when the user is trying to access a protected application, or when the user is trying to access another website through an authorized session), and trigger an anomaly and take action such as a block on the activity based on the same policy. For instance, the one or more agents 235 and/or one or more Webgates 250 may check whether the session is still valid based on whether a time period has expired. In some instances, the time session will be valid for a predetermined period of time such as an hour or eight hours. The moment that session is invalid the user will be asked to login again. The one or more agents 235 and/or one or more Webgates 250 may try to validate the session using the policy and drop the session if the session is no longer valid. The one or more access managers 245 may also obtain the same policy and the next time the same user tries to login using the correct username and password the one or more access managers 245 may not grant the user access. Thus, even if a resource is not protected by one of the agents such as the one or more proxies 240, the one or more agents 235, one or more access managers 245, and/or one or more Webgates 250 have the same policy from the policy bus 210 and can take independent action on user activity. Accordingly, each of the agents reacts to the policy separately and differently, as opposed to conventional systems where the agents react as a group the same way once a rule is determined.

FIG. 2 further illustrates a mechanism for providing a user interface based on the event/data collection and the enforcement of static and dynamic policies on user activity. In various embodiments, a consolidated user interface 280 is provided via the visualization server 230. In some embodiments, the consolidated user interface 280 comprises active threat categories, a count of policies being triggered for each threat category, and associated trends. In other embodiments, the consolidated user interface 280 comprises users, sources being accessed by users, and the policies, if any, implicated by the such activity. In yet other embodiments, real time statistics are published and viewed on the consolidated user interface 280 for different time buckets such as 5 minutes or 15 minutes etc. at a predetermined time interval (e.g., every 2 seconds, 4 seconds, 5 seconds, 30 seconds, etc.), so that a security administrator can take appropriate actions on "real-time trends."

The consolidated user interface 280 may be presented to a security administrator when they log into the system. The consolidated user interface 280 may present the top users that are creating the network traffic and the sources that these users are accessing. Collected real-time data from the collection bus 205 may be fed into the system. The consolidated user interface 280 may present how often the user is accessing different sources on the network within a time period (e.g., 5 minute window, 30 minute window). The consolidated user interface 280 may be constantly updated as new data comes in, e.g., showing current minus 5 minutes. The top IP addresses that are active can also be shown. Some embodiments may show a correlation between the IP addresses that are highly active and the sources (e.g., URLs) that are popular and have a high traffic. Certain embodiments may also notate the IP addresses (e.g., using an asterisk) where the user has not been identified.

Some embodiments may present client IP address to application mapping in addition to user to application mapping. Certain embodiments may show that a particular IP address can be causing accesses to many different sources and vice versa where a particular URL are being accessed by all the different users. The consolidated user interface 280 presents the end users (or client IP addresses) on one side and the end sources on the other side. Some embodiments may also use colors to differentiate the groups. Certain embodiments may also present information such as the number of times that each application is being accessed. By selecting a particular user or client IP address, some embodiments may present the number of times that the particular user or client IP address has accessed the application.

Some embodiments enable an administrator via the consolidated user interface 280 to set one or more criteria for matching and values for the criteria. Certain embodiments also enable the administrator via the consolidated user interface 280 to specify the desired alert and duration for the alert if the one or more criteria and values for the criteria for an event match those specified by the administrator. For instance, some embodiments can match up the user and the client IP address and which destination (e.g., host name, particular IP address, services) this user is accessing, or match up the activity of the user, and provide a corresponding alert as designated by the administrator.

III. Consolidated User Interfaces

FIG. 3 is a block diagram illustrating some of the functional components of a threat visualization system 300 in accordance with various embodiments. The illustrated system includes three layers: a presentation layer 305, application layer 310 and database layer 315. The presentation layer 305 includes a plurality of user interfaces (e.g., graphical user interfaces (GUIs)) through which users (e.g., customers or administrators) monitor user activity on a network of an enterprise in order to detect threats in real-time based. These include a plurality of UIs 320, 325, 330, and 335 (e.g., consolidated user interface 280 as described with respect to FIG. 2). In some embodiments, UIs 320, 325, 330, and 335 reside on one or more workstations. In other embodiments, UIs 320, 325, 330, and 335 reside on one or more personal computers. In general, UIs 320, 325, 330, and 335 can reside on any computational system, and although four UIs are shown in FIG. 3 it should be understood that any number of UIs can be developed and provide in accordance with the aspects described herein.

UIs 320, 325, 330, and 335 are coupled to one or more application servers 340 and 345 (e.g., analytics server 220, machine learning component 225, and visualization server 230 as described with respect to FIG. 2) within application layer 310. Application servers 340 and 345 implement the operations to facilitate security and threat assessment in real-time on the underlying enterprise network, in doing so they communicate and process information between UIs 320, 325, 330, and 335 and the enterprise network. In various embodiments, the application servers 340 and 345 facilitate security and threat assessment through a set of mechanisms described herein. Application servers 340 and 345 may be located at a number of locations in a distributed computing system, including at a computational server or a database server, and may be in communication with any of the UIs in the presentation layer.

Application servers 340 and 345 are coupled to database management system 350 (e.g., memory 255 as described with respect to FIG. 2) within the database layer 315. Database management system 350 can be any type of custom-made or commercially available database system for managing storage and retrieval of data. In some embodiments, database management system 350 includes database servers, and the like. Exemplary database servers include without limitation those commercially available from Oracle, Microsoft, Sybase, IBM and the like. Database management system 350 is coupled with caches and databases 355 (e.g., caches 265 and 270, and database 260 as described with respect to FIG. 2). Caches and databases 355 can be any type of caches or databases which data can be stored and retrieved. This includes, but is not limited to, hierarchical databases and relational databases.

Figure 4A:
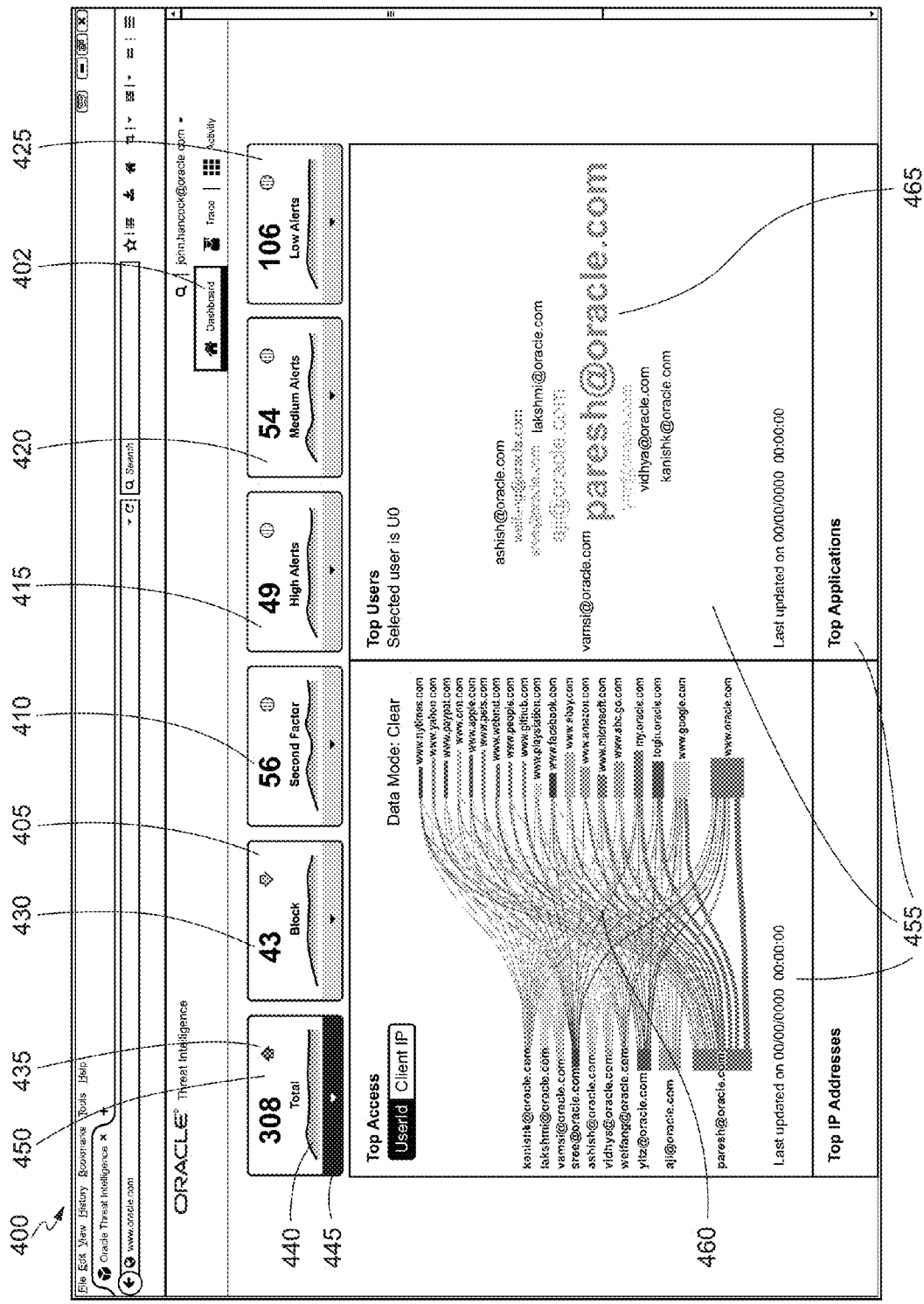
FIGS. 4A and 4B depict user interfaces (UIs) for displaying active threat categories in accordance with some embodiments.
Figure 4B:
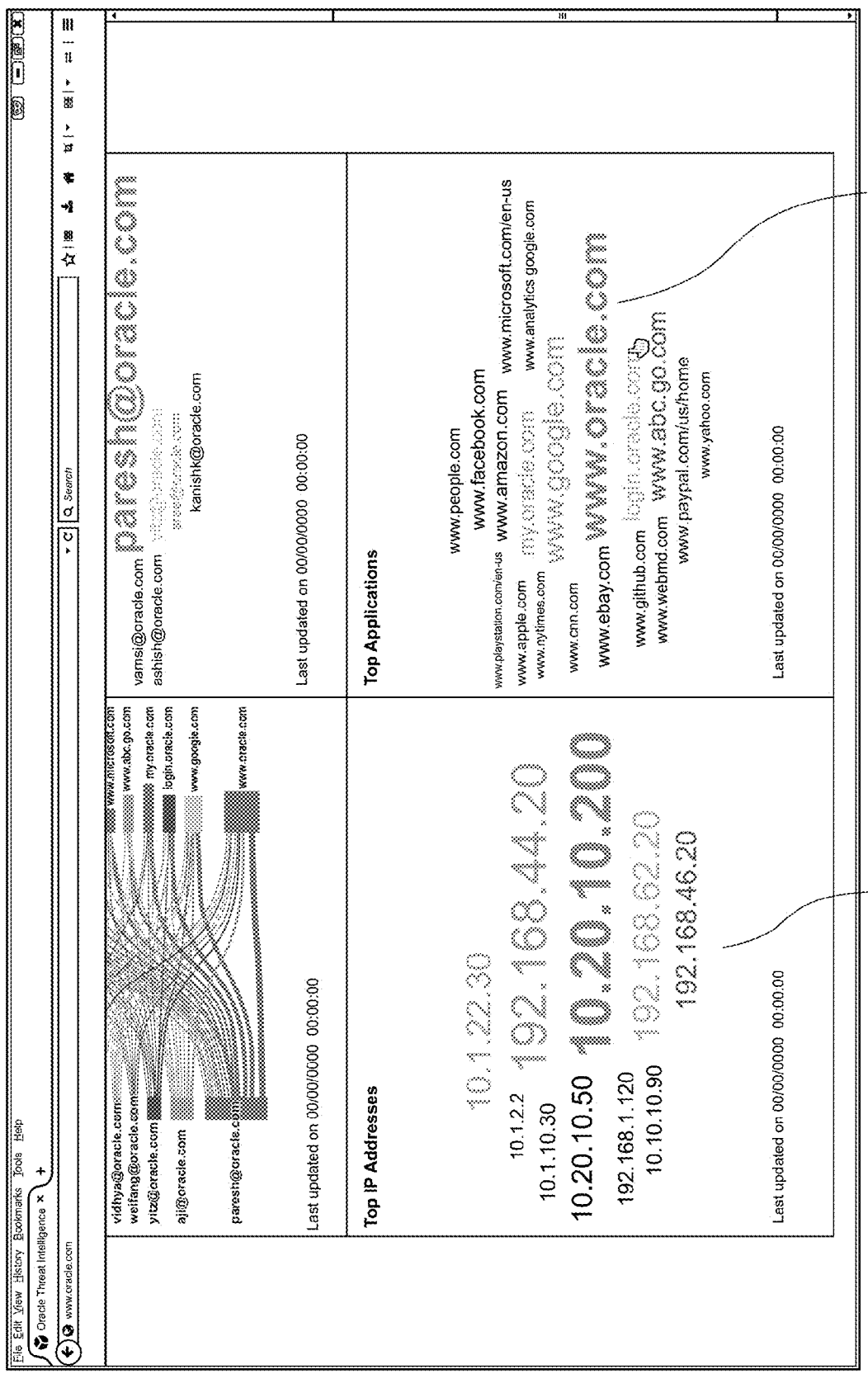

In various embodiments, the presentation layer 305, application layer 310 and database layer 315 operate to provide UIs 320, 325, 330, and 335, which comprise active threat categories, a count of policies being triggered for each threat category, and associated trends. As shown in FIGS. 4A and 4B, some embodiments may provide a consolidated UI 400 of active threats based on a threat-level classification scheme. As discussed herein, the enforcement policies (e.g., static and dynamic) may be classified as block, step-up or second factor, high alert, medium alert, and low alert policies. For example, the analytics server 220 and machine learning component 225 can dynamically create a policy for "Unusual Application Access" as a low alert, if only one occurrence was observed for example. However, based on other factors, the same policy can be injected as a second factor policy, preventing an unauthenticated user from getting access. This classification scheme for the enforcement action of the policies can be used by the application layer 310 to display a dashboard 402 of consolidated UI 400 having various corresponding buckets including block 405, step-up or second factor 410, high alert 415, medium alert 420, and low alert 425. The threat-level classification scheme for the enforcement action of the policies may help an administrator to evaluate a policy and elevate the level from a low to higher level and vice versa. Some embodiments may also include the machine learning component 225 in making the determination for elevating or de-escalating a threat level for a policy. Furthermore, providing the consolidated UI 400 of the of active threats based on threat-level as opposed to policy names may help security administrative groups to focus on different types of threat and actions based on their classification rather than having to interpret the threat level based on the name of a policy.

The buckets 405, 410, 415, 420, and 425 may include for each classification the total number of policies "n" 430 with the corresponding classification that are being triggered at any given time by user activity on the enterprise network. The buckets 405, 410, 415, 420, and 425 may further include for each classification associated trends in the number of policies "n" 430 that are being triggered. For example, graphics such as markers 435 and graphs 440 may be used to denote the historical trends for the number of policies "n" 430 that are being triggered. In some embodiments, if the number of policies "n" 430 that are being trigger is increasing (e.g., n+1, 5, 10, 15, etc.), then a up-arrow can be used to easily denote this trend. In contrast, if the number of policies "n" 430 that are being trigger is decreasing (e.g., n−1, 5, 10, 15, etc.), then a down-arrow can be used to easily denote this trend. If the number of policies "n" 430 that are being trigger, is substantially remaining the same (e.g., +/−5%, 10%, or 15%), then a circle can be used to easily denote this trend. In certain embodiments, the buckets 405, 410, 415, 420, and 425 may further include drop down boxes 445 that may be accessed by an administrator to investigate further into the details regarding the policies being triggered and the activity being performed by users (e.g., sources being accessed) on the enterprise network. In certain embodiments, the consolidated UI 400 further includes an additional bucket 450 for the total number of policies "m" (all classification groups) being acted upon at any given time.

In accordance with the various aspects discussed herein, user behavior on the enterprise network may be monitored and one or more dynamic policies may be created for the users. In some embodiments, an administrator or the machine learning component 225 can set an enforcement policy where certain actions would trigger a block, a second factor authentication, a low alert, a medium alert, or a high alert. For example, the machine learning component 225 can detect a variation or deviation of real-time data from historic data (e.g., a user typically accessing from home around 7 or 8 pm and today the user is accessing from somewhere else), and create a policy for this deviant access. The policy may designate this access with an alert level (e.g., low, medium, or high alert) or a second factor authentication or block designation. Based on whether the user is authenticated with the challenges presented through the second factor authentication, the system may use this historical data to modify the policy. If the alert level becomes escalated depending on the user's further actions and causes a new policy to designate the action as a high alert item, then the consolidated user interface 400 may start presenting the high alert action through the dashboard 402. If there is repeated high alerts from this user (e.g., 10 or 20 times) within a short period of time (e.g., last 10 seconds, last 20 seconds), then the machine learning component 225 may alert the administrator via the consolidated user interface 400 since it is likely that there is a problem.

In some embodiments, the dashboard 402 may have various windows 455 that display information including the top access activity, top users accessing sources, top IP addresses being used to access sources, and top sources being accessed. The top or bottom can be defined as a threshold number such as the top or bottom 5, 10, 15, 35, or 50. Alternatively, the top or bottom can be defined as a threshold percent such as the top or bottom 5%, 10%, 15%, 35%, or 50%. The windows 455 can display the information using any number of graphical means. For example, the top access activity can be displayed using pictogram or a line diagram 460 that illustrates a line connecting each user ID or IP address to a resource or target system being accessed. Additionally or alternatively, the top user can be displayed using a proportional area chart, a bubble chart, or a tag cloud 465 with changes in typography such as font size or color. Additionally or alternatively, the top IP addresses can be displayed using a proportional area chart, a bubble chart, or a tag cloud 470 with changes in typography such as font size or color. Additionally or alternatively, the applications can be displayed using a proportional area chart, a bubble chart, or a tag cloud 475 with changes in typography such as font size or color.

Figure 5:
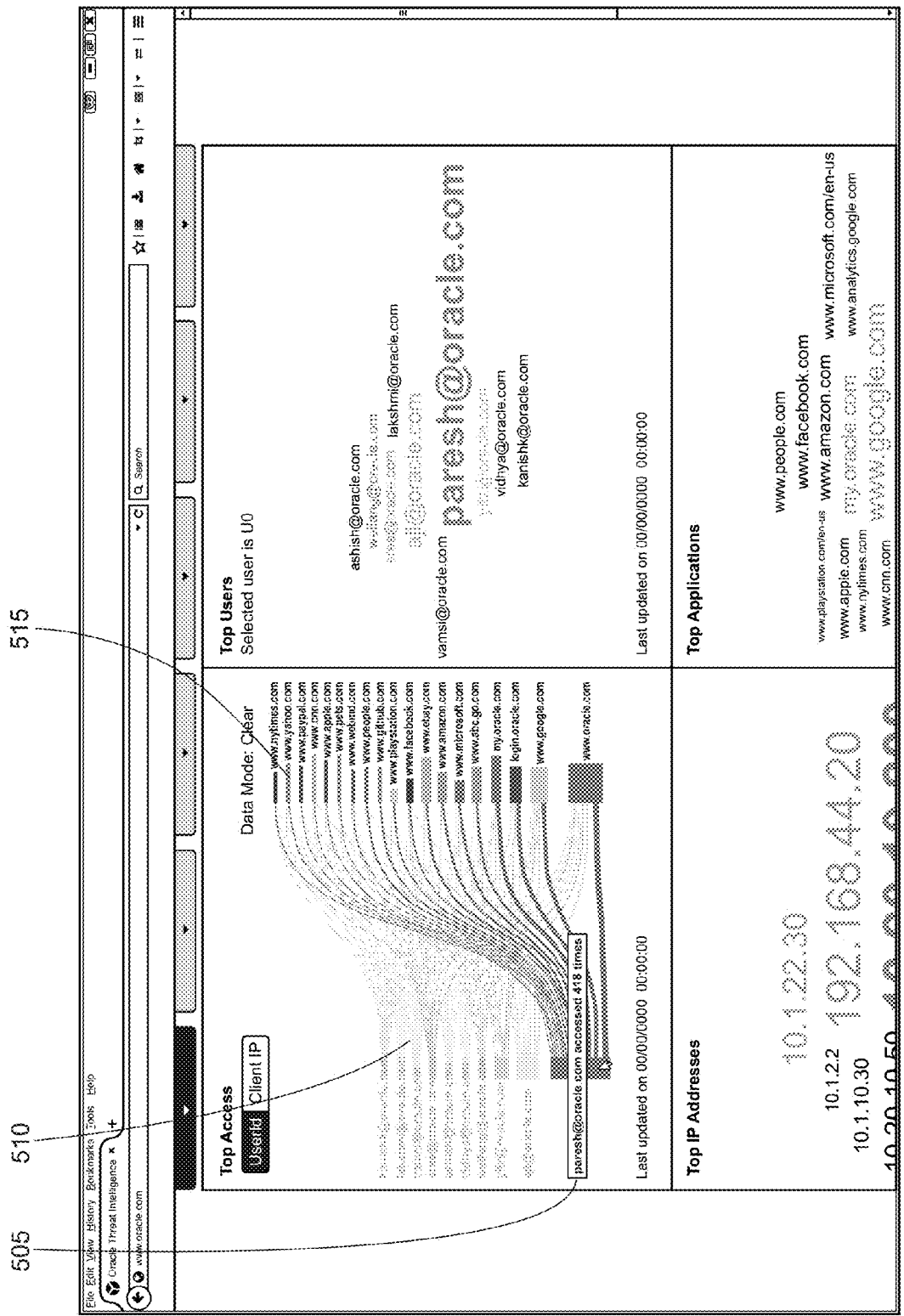
FIGS. 5-11 depict additional UIs for displaying active threat categories in accordance with some embodiments.
Figure 6:
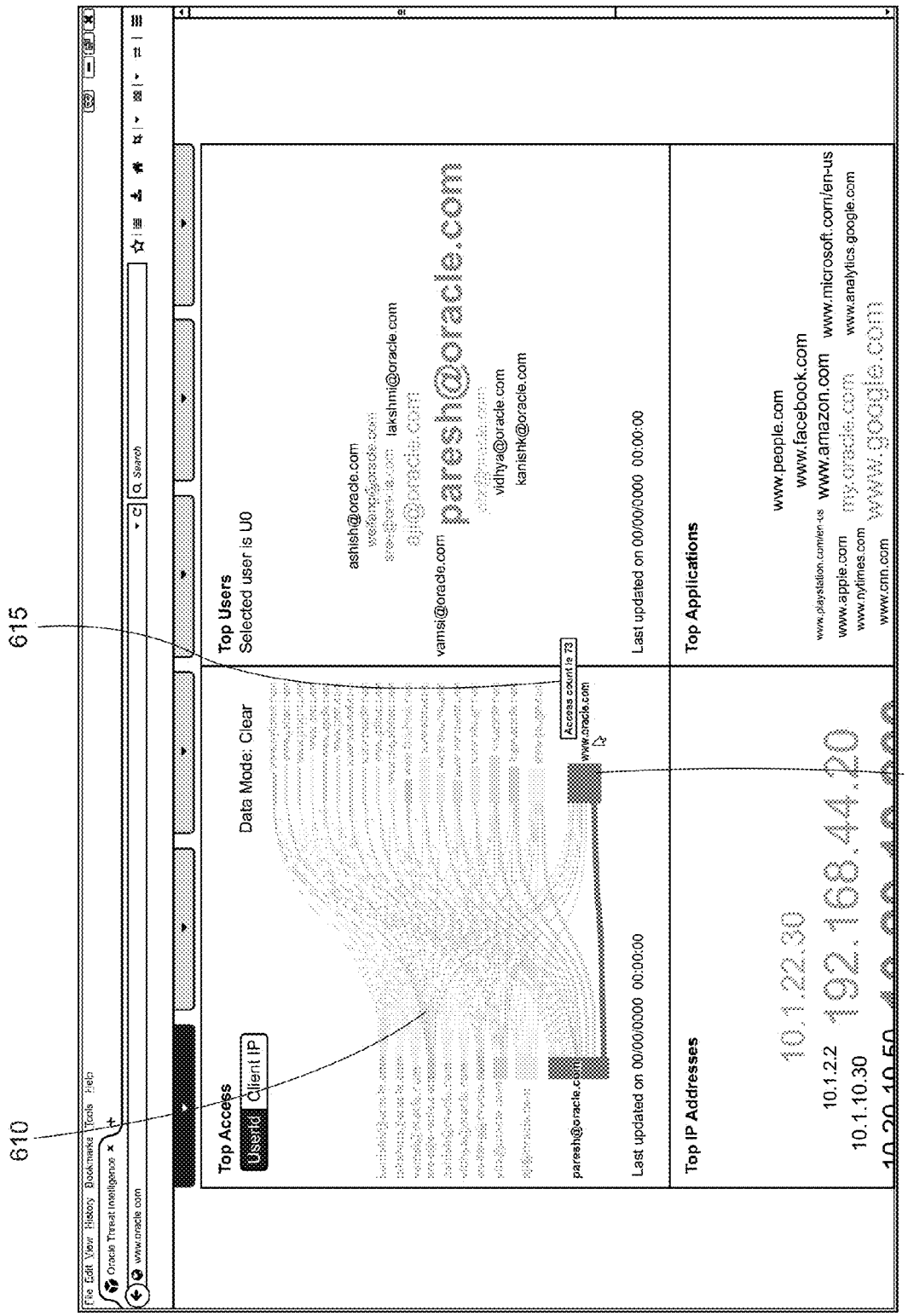
Figure 7:
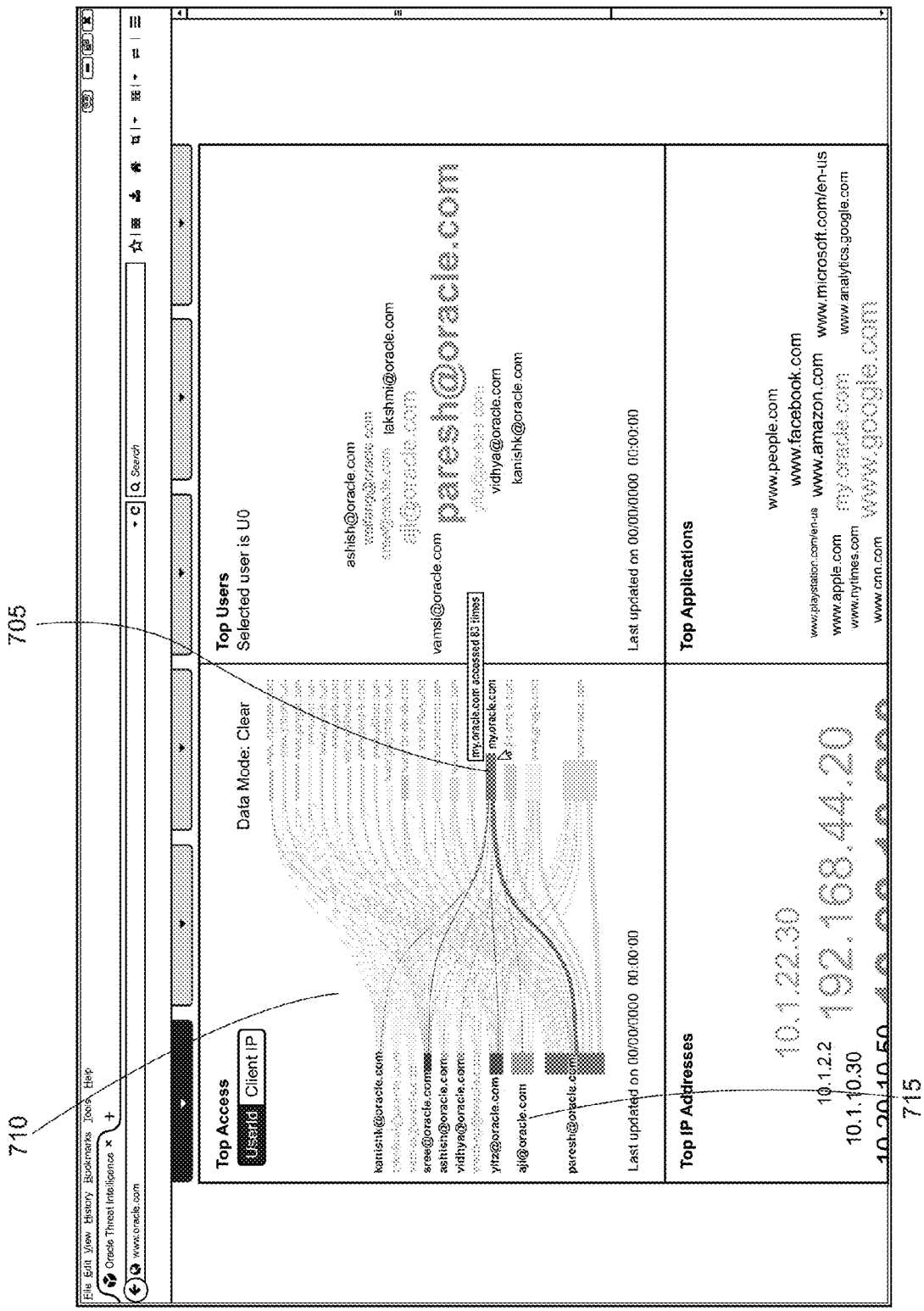
Figure 8:
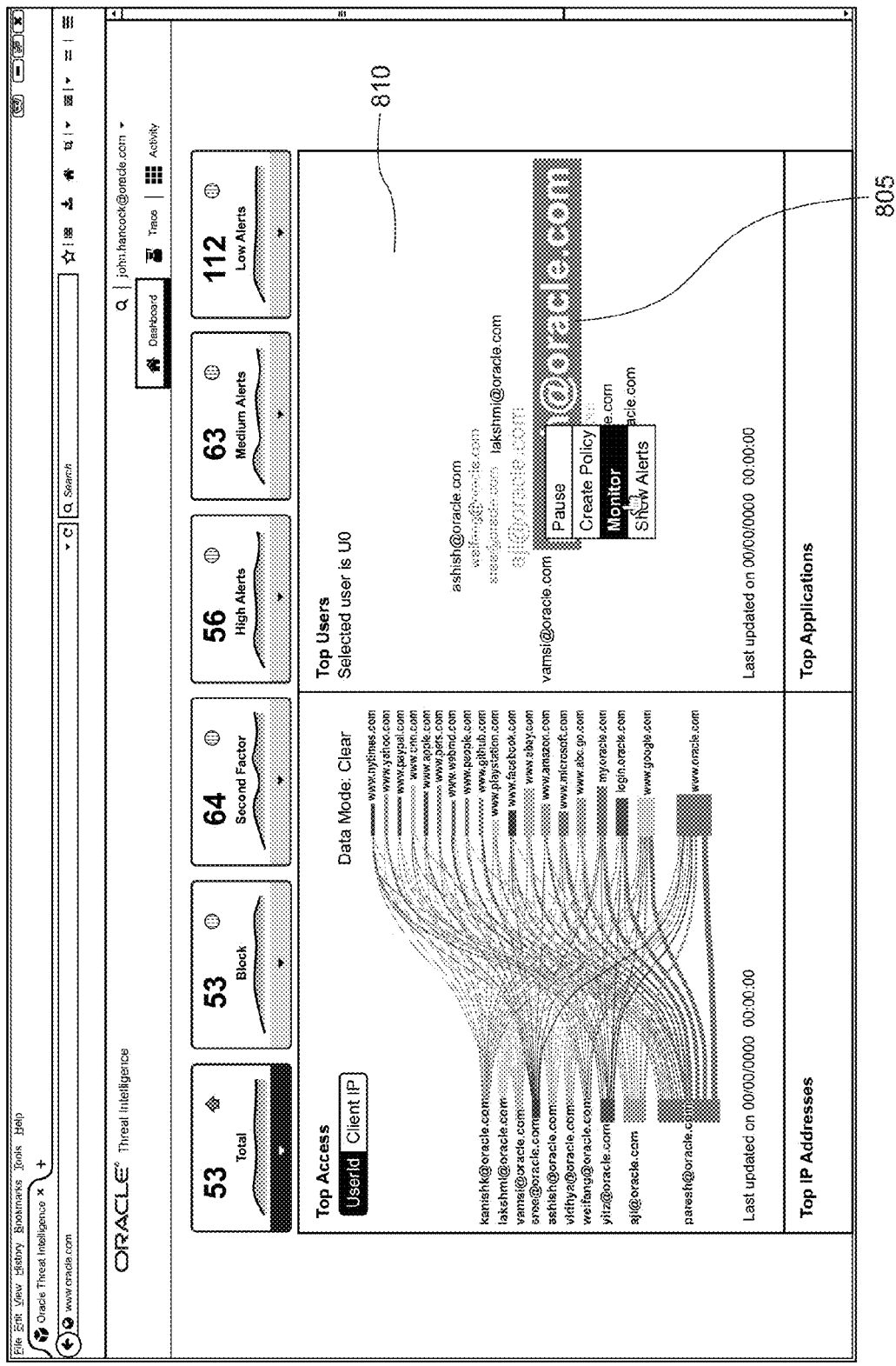
Figure 9:
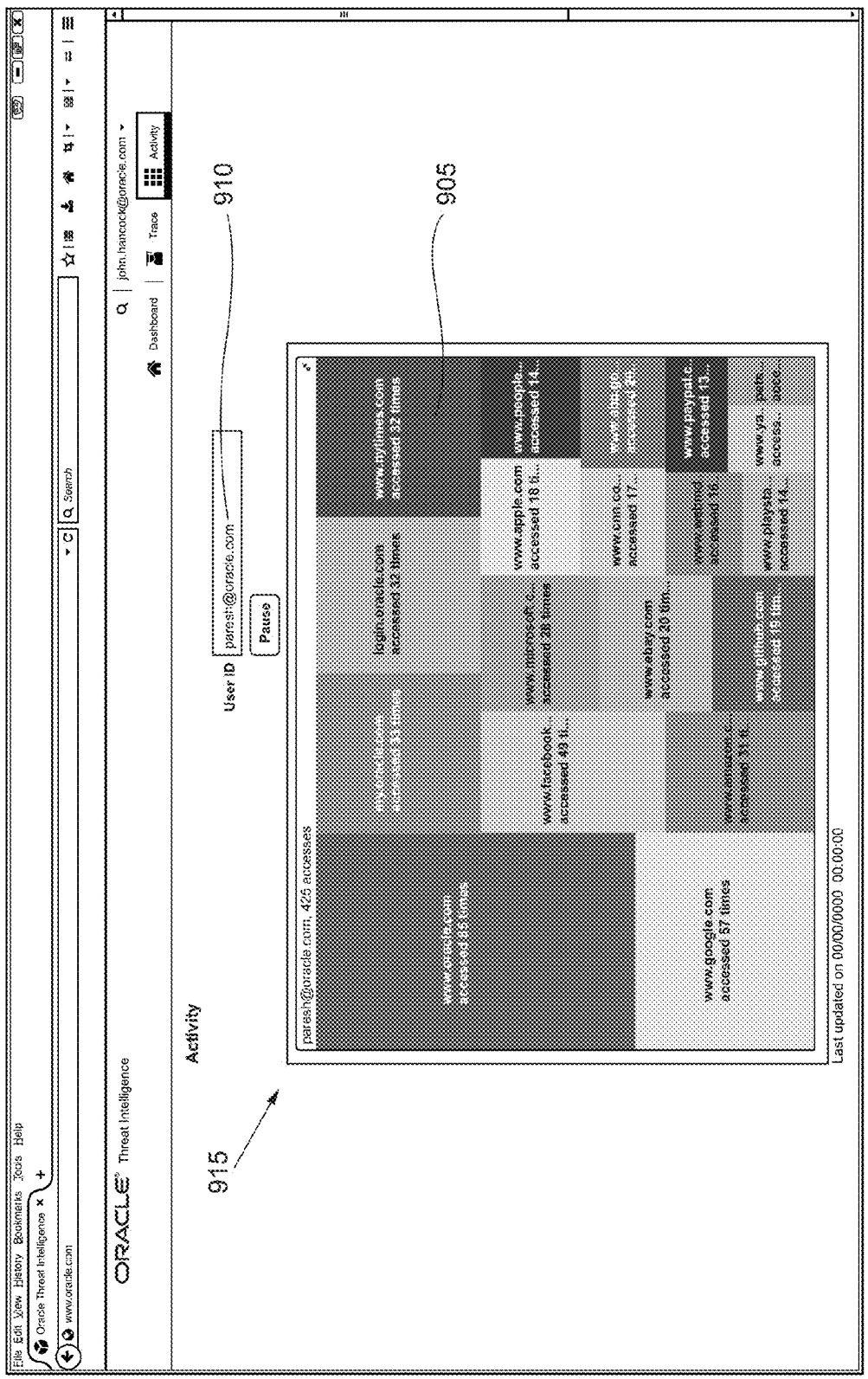
Figure 10:
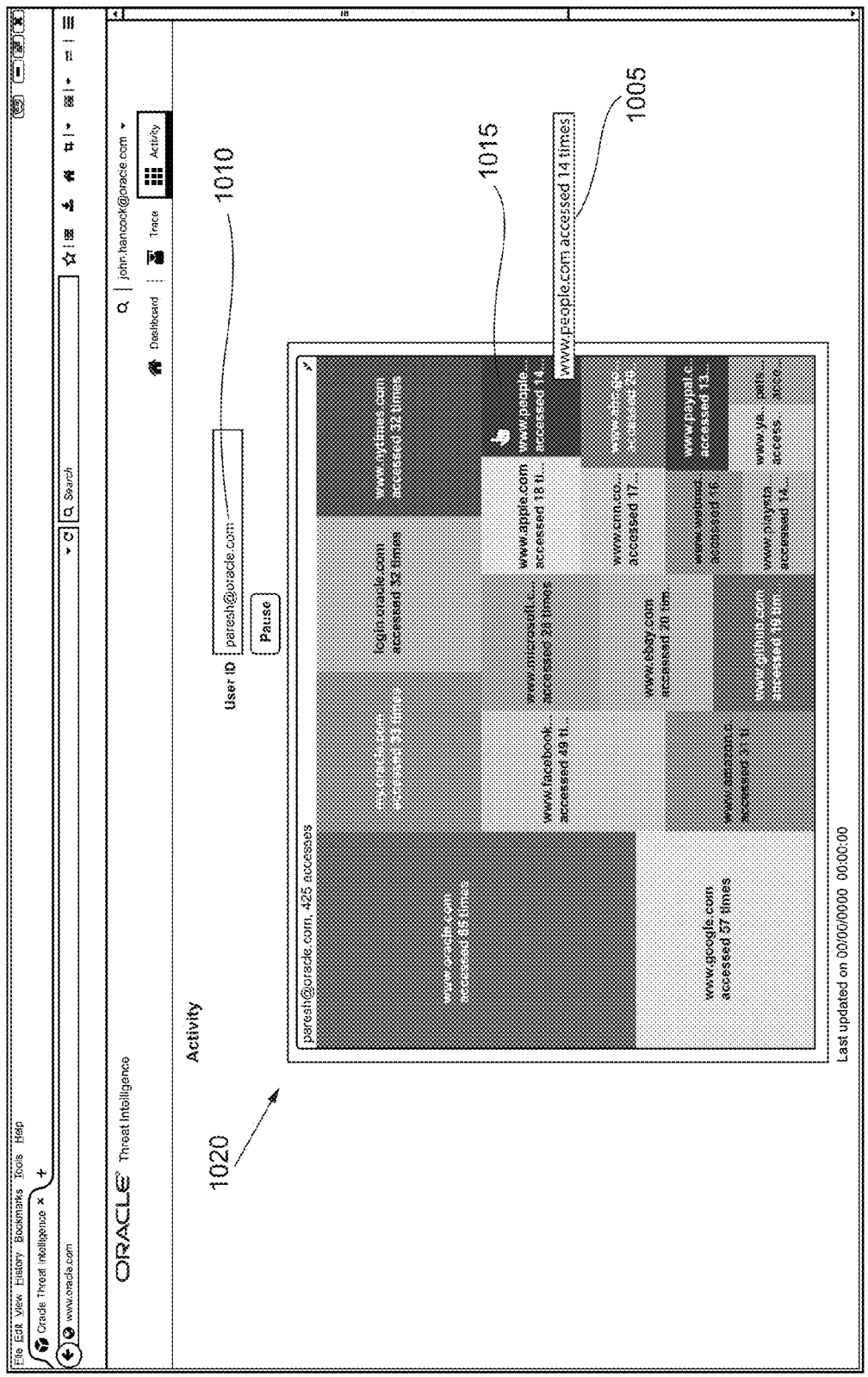
Figure 11:
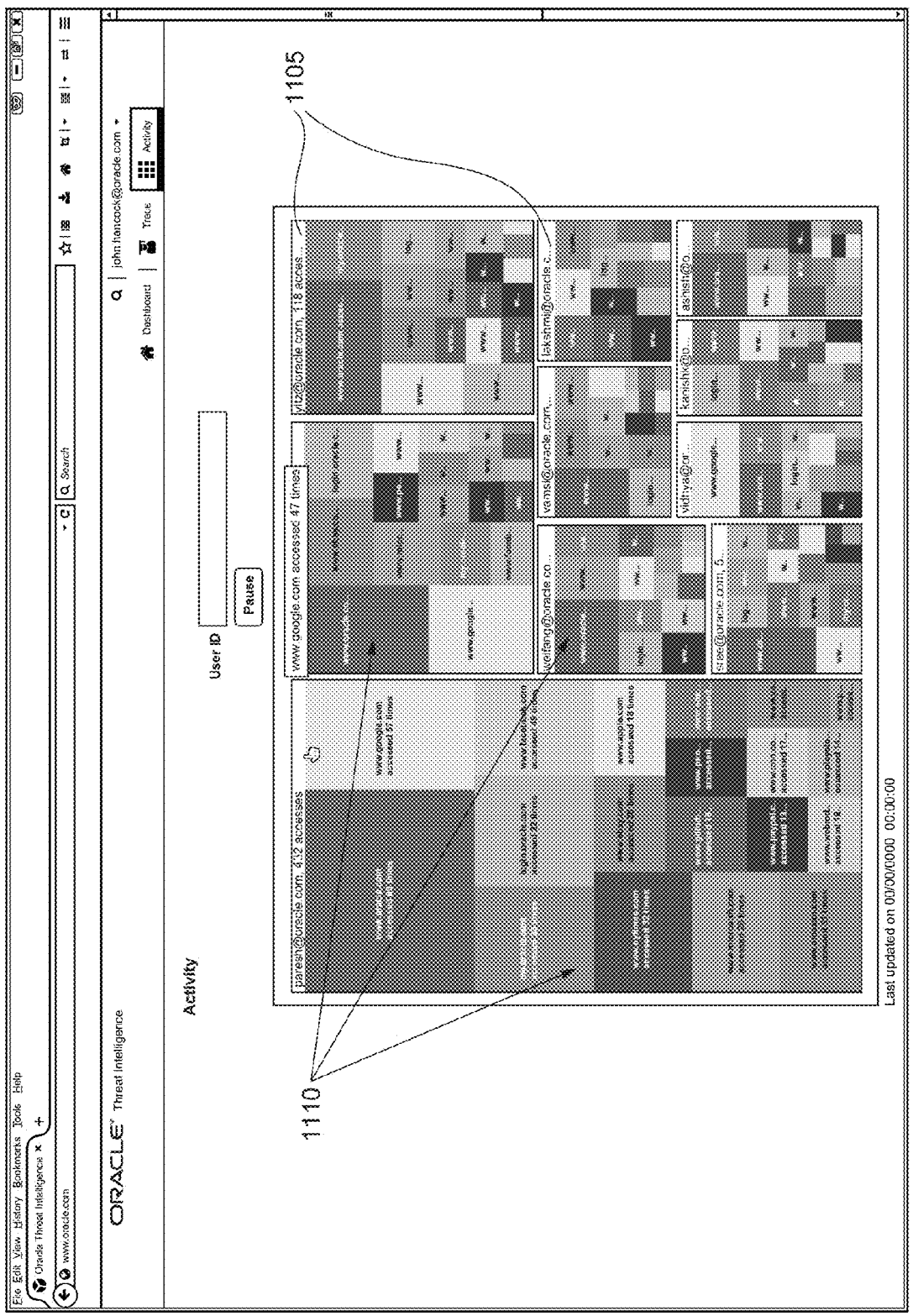

In some embodiments, the presentation layer 305, application layer 310 and database layer 315 may further operate to provide additional functionality or information for an administrator. For example, FIG. 5 illustrates that by hovering an input device such as a mouse pointer over a particular user 505 within a window 510 of the dashboard, an administrator can isolate the resources 515 that the particular user has accessed. FIG. 6 illustrates that by further hovering an input device such as a mouse pointer over a particular URL 605 within a window 610 of the dashboard, an administrator can view the specific access count 615 or number of times that a user or IP address has accessed a resource. FIG. 7 illustrates that by hovering an input device such as a mouse pointer over a particular URL 705 within a window 710 of the dashboard, an administrator can view the various users 715 that are accessing the URL. FIG. 8 illustrates that the administrator may use an input device such as a mouse pointer to select a particular user 805 within a window 810 of the dashboard and choose to monitor the particular user 805. FIG. 9 illustrates a view in which the administrator may monitor the activities 905 of the particular user 910 using a proportional area chart 915 or a bubble chart. FIG. 10 illustrates that by hovering an input device such as a mouse pointer over a URL, the administrator may view the number of times 1005 in which the particular user 1010 has accessed the URL 1015 within a proportional area chart 1020 or a bubble chart. FIG. 11 illustrates a view in which the administrator may monitor the activities of a plurality of the users 1105 using a plurality of proportional area charts 1110 or bubble charts.

Figure 12A:
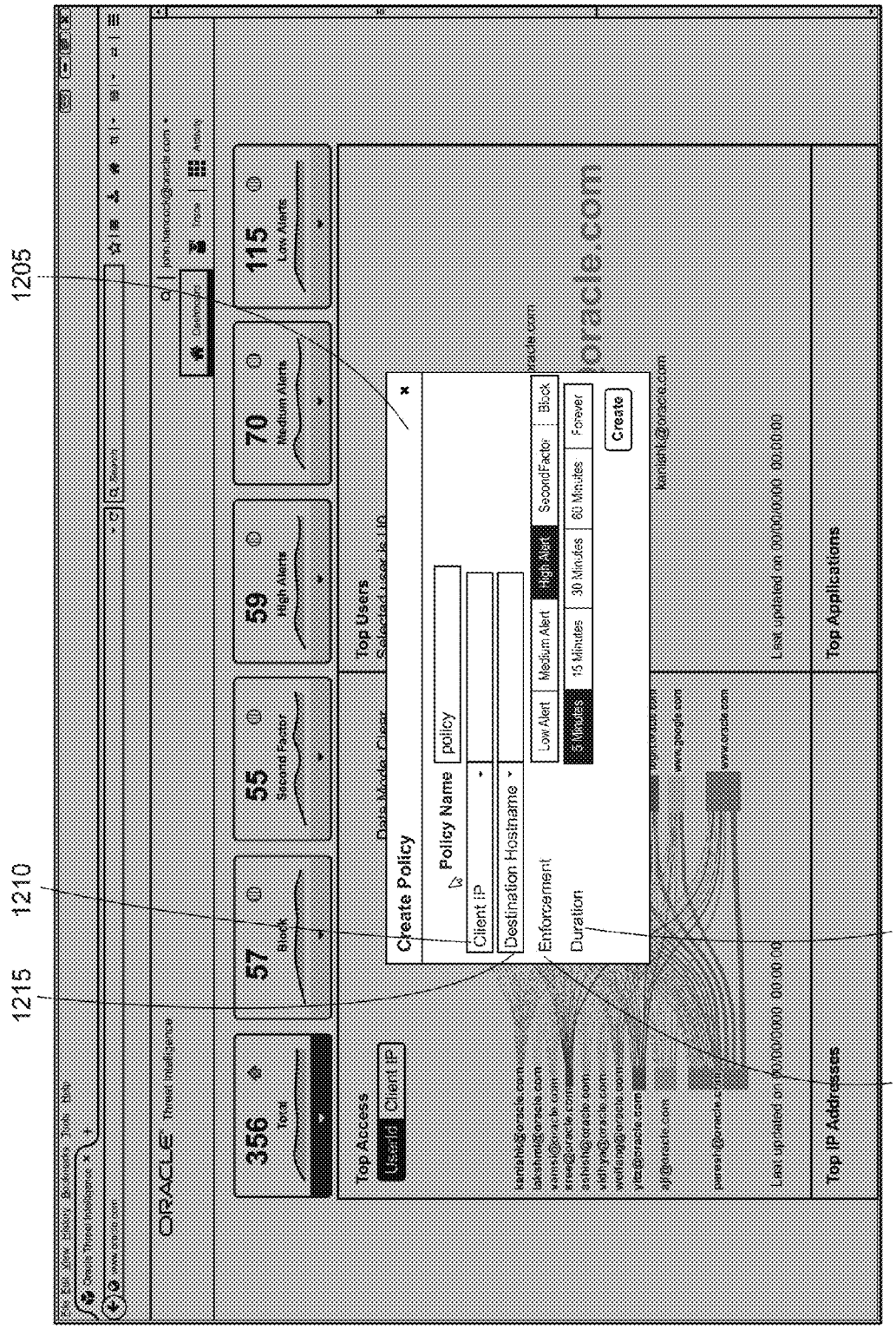
FIGS. 12A and 12B depict UIs for enabling an administrator to create one or more policies in accordance with some embodiments.
Figure 12B:
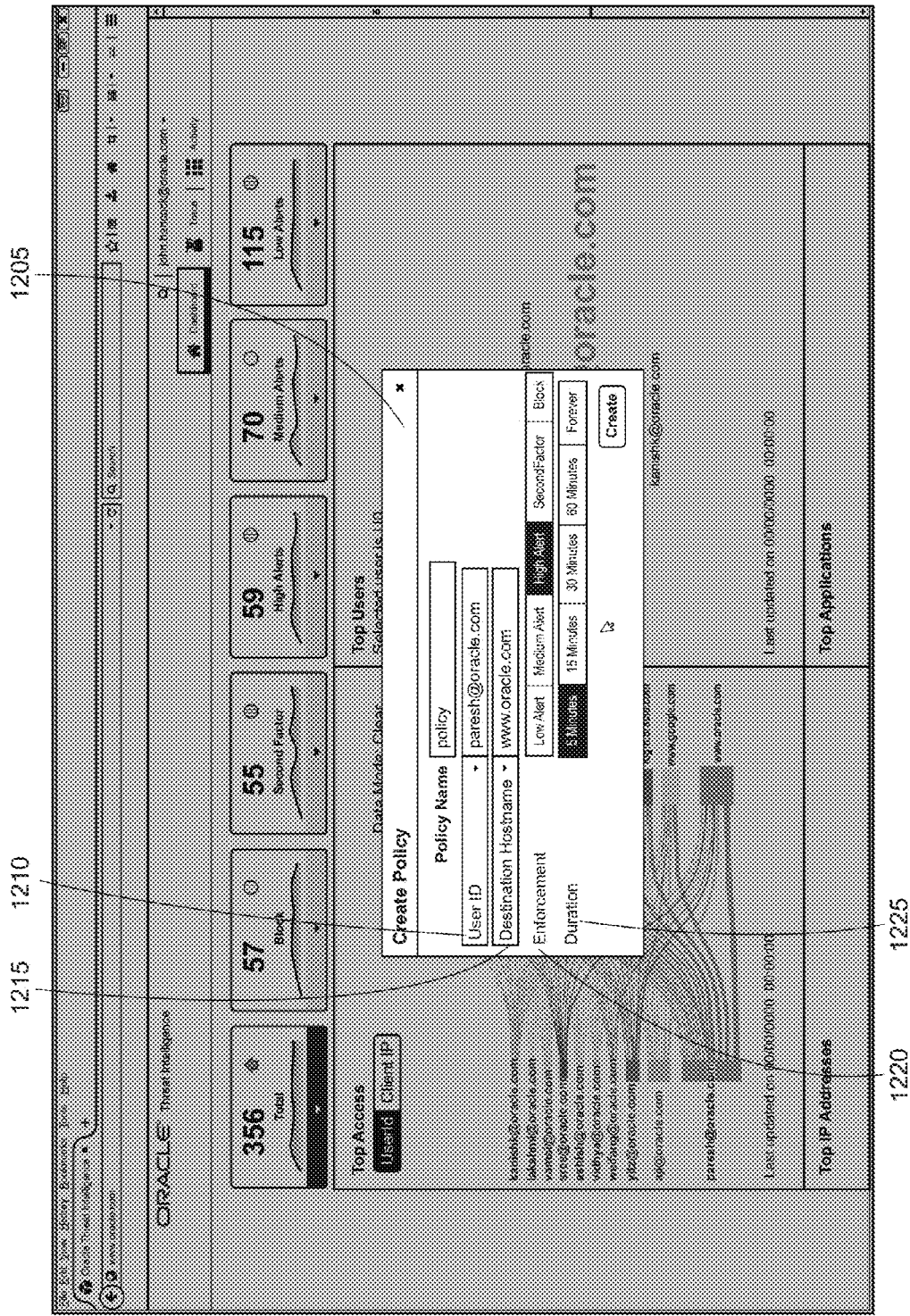

In some embodiments, the presentation layer 305, application layer 310 and database layer 315 may further operate to provide additional functionality for an administrator to create one or more policies (e.g., inspection or enforcement policies). FIGS. 12A and 12B illustrate an example of the UI 1205 for enabling an administrator to create one or more policies according to certain embodiments. In some embodiments, the administrator may decide to create one or more policies after observing anomalous activity using any of the UIs described herein. The administrator may specify a source 1210 for the policy by user ID, IP address, user ID, group designation, etc., or leave blank to specify the source 1210 to be any source. The administrator may specify the destination 1215 for the policy by hostname, target system name or ID, IP address, resource name, etc., or leave blank to specify the destination 1215 to be any destination. The administrator may specify an enforcement action 1220 for the policy. The enforcement action 1220 may include a low alert, a medium alert, a high alert, second factor authentication, or a block. As should be understood, a perceived threat level from the anomalous activity can be used to classify the policy as a low risk, a medium risk, a high risk, second factor authentication risk, or a block risk. The administrator may specify duration or predetermined period time 1225 for the policy to be active. In some embodiments, the duration 1225 can be 5, 15, 30, or 60 minutes, which allows the administrator to view how the policy impacts the network traffic via any of the UIs described herein for the predetermined period of time. Thereafter, the administrator can let the policy expire if the policy did not have the intended affect or the policy is no longer warranted for the anomalous activity, or the administrator can modify the duration 1225 to extend the active state of the policy. In certain embodiments, the duration 1225 can be forever, which allows the administrator to permanently overwrite static policies or make changes in security strategy on the enterprise network in real-time.

Figure 13:
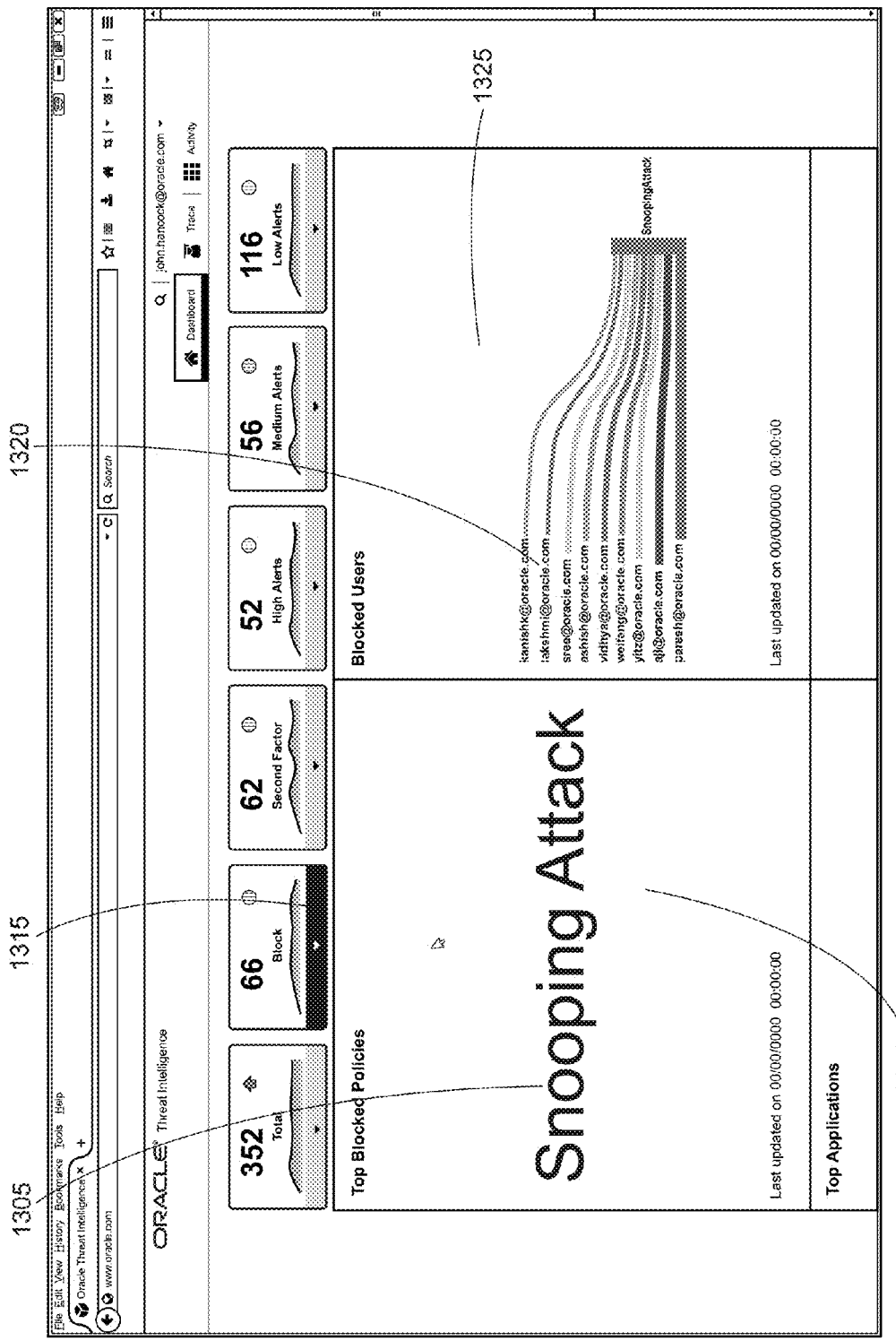
FIGS. 13-16 depict additional UIs for displaying active threat categories in accordance with some embodiments.
Figure 14:
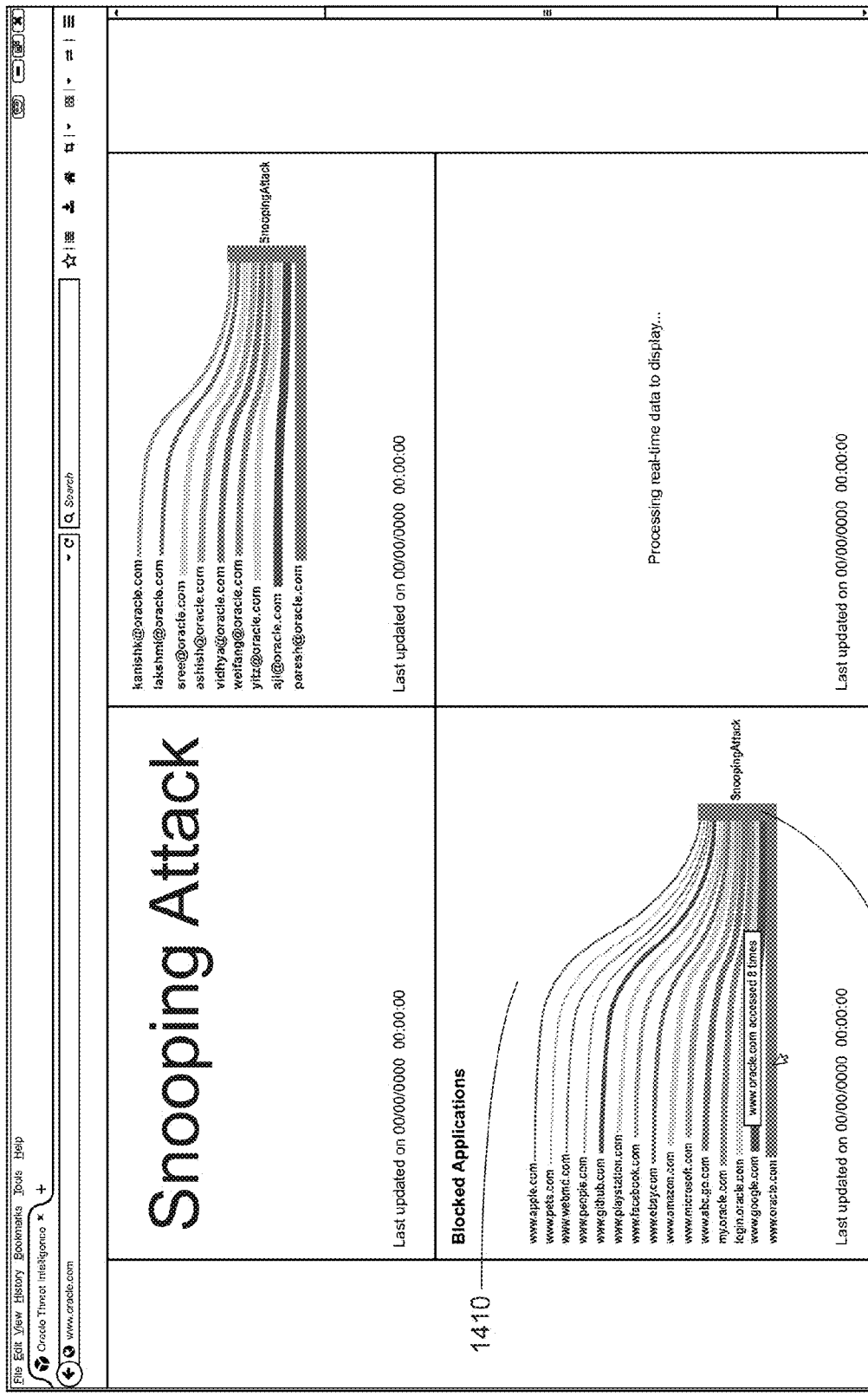

In some embodiments, the presentation layer 305, application layer 310 and database layer 315 may further operate to provide additional functionality or information for an administrator. Some embodiments display to an administrator the number of a certain type of policies (e.g., block policies) during a specific time interval. Certain embodiments allow for an administrator to view which policies caused a certain action or alert (e.g., a block) (e.g., by selecting a UI element). For example, FIG. 13 illustrates that the administrator may view the names of the top policies 1305 under each classification within a window 1310 upon selecting a corresponding mode 1315 (e.g., a top blocked policy mode) in accordance with certain embodiments. Some embodiments also enable the administrator to view the top users 1320 within a window 1325 who associated with the top policies 1305 and violated the policy a number of times. The top or bottom can be defined as a threshold number such as the top or bottom 5, 10, 15, 35, or 50 policies being triggered. Alternatively, the top or bottom can be defined as a threshold percent such as the top or bottom 5%, 10%, 15%, 35%, or 50% policies being triggered. FIG. 14 illustrates that the administrator may view the resources 1405 in window 1410 and the enforcement action (e.g., a block) taken based on the top policies 1305 in accordance with some embodiments. These displays enable the administrator to see which users, resources, IP addresses, and policies pertain to the top policies being triggered for each classification or perceived threat level. In some embodiments, an administrator can select a particular user and view how many alerts were set off by the particular user (e.g., 15 of the blocks and 2 of the second factors were from this person).

By displaying various types of information to the administrator, the administrator can take appropriate action (e.g., in response to seeing different trends). The UIs described herein displaying an upward trend for certain alerts may enable the administrator to only need to react and take appropriate action when he sees an increasing trend of alerts. Some embodiments may enable an administrator to view which user/client IP address/source, was blocked by a high alert when going to a certain application, under a certain policy. When looking at policies, there are attributes that would enable an administrator to distinguish a manually injected policy against a machine learning policy. In some embodiments, an administrator may only be able to edit a manually created policy as opposed to a machine learning policy.

Figure 15:
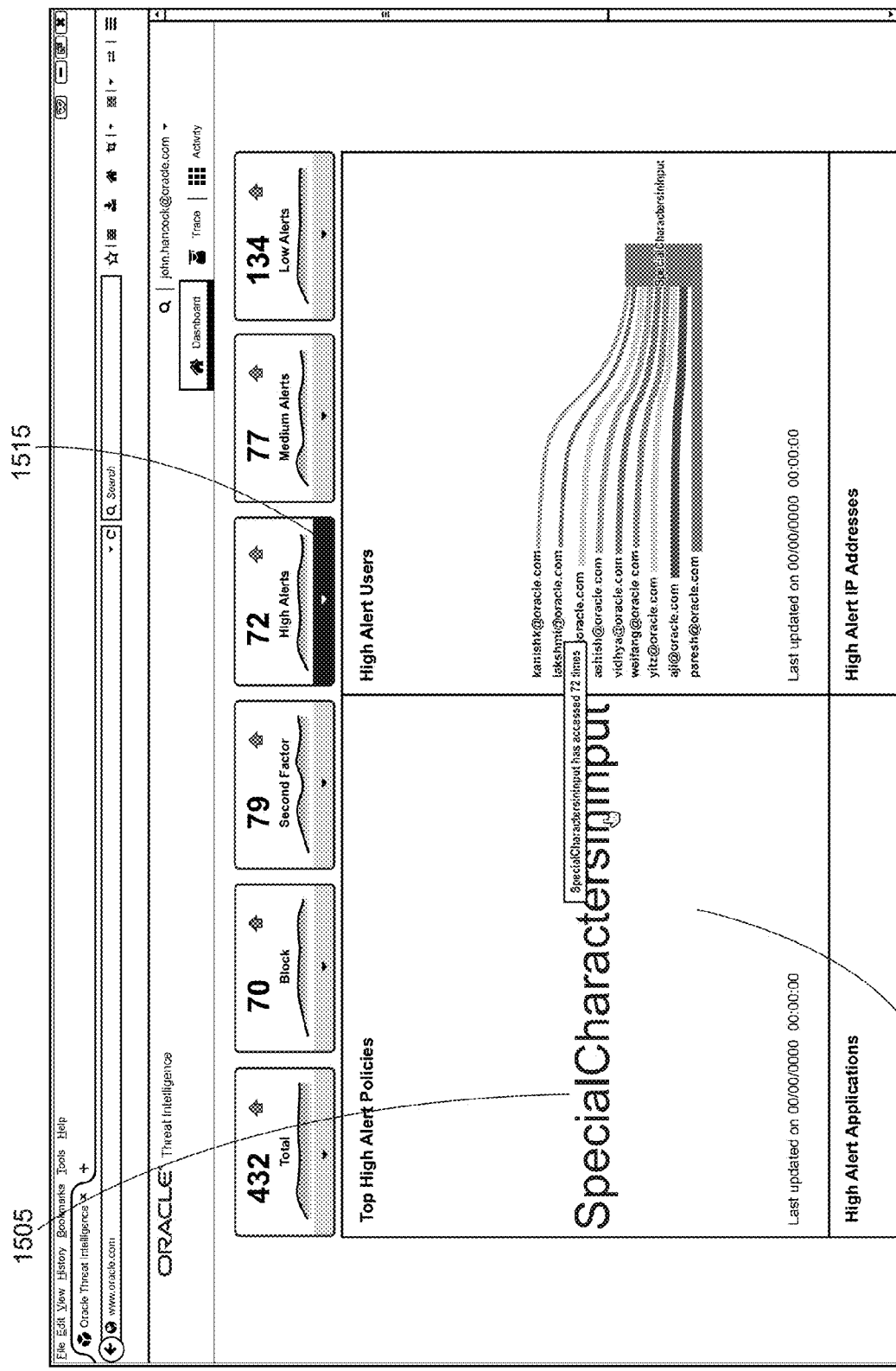
Figure 16:
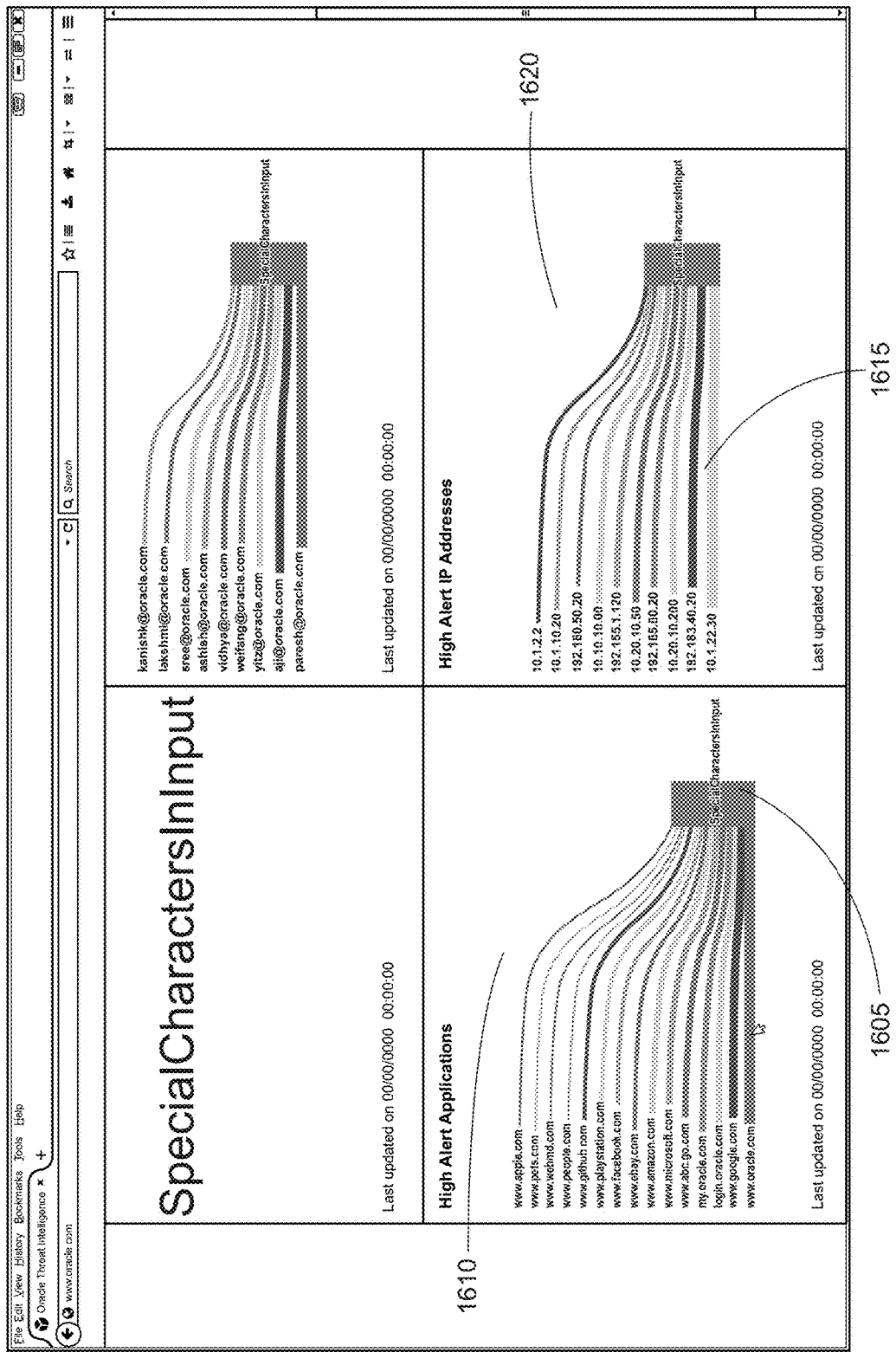

In various embodiments, an administrator may monitor the low, medium, and high alerts, and provide recommendations that certain policies causing the alerts may need to modified, for example, any high alerts may need to be modified for a block policy. Another system administrator may be notified of those policies that are recommended to be modified and make a determination as to whether to upgrade the policy to a block policy. FIG. 15 illustrates that the administrator may view the names of the top policies 1505 under each classification (e.g., high alert) within a window 1510 upon selecting a corresponding mode 1515 (e.g., high alert policy mode) in accordance with certain embodiments. FIG. 16 illustrates that the administrator may view the resources 1605 in window 1610 and the action (e.g., a high alert) that was taken based on the top policies 1505 and view the IP addresses 1615 in window 1620 and the action (e.g., a high alert) that was taken based on the top policies 1505, in accordance with some embodiments.

Figure 17:
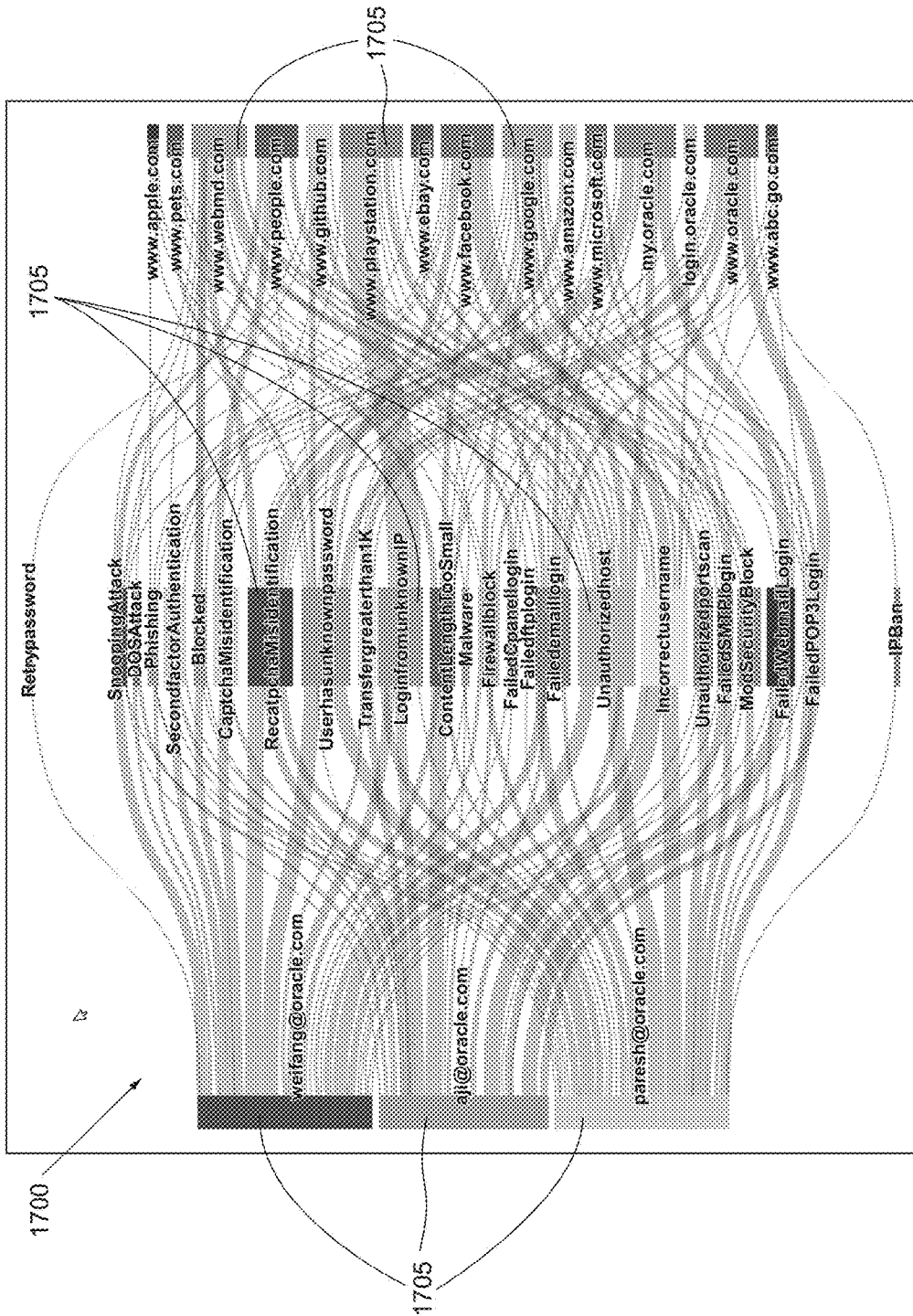
FIG. 17 depicts UIs for displaying active threats based on policies being triggered in accordance with some embodiments.
Figure 18:
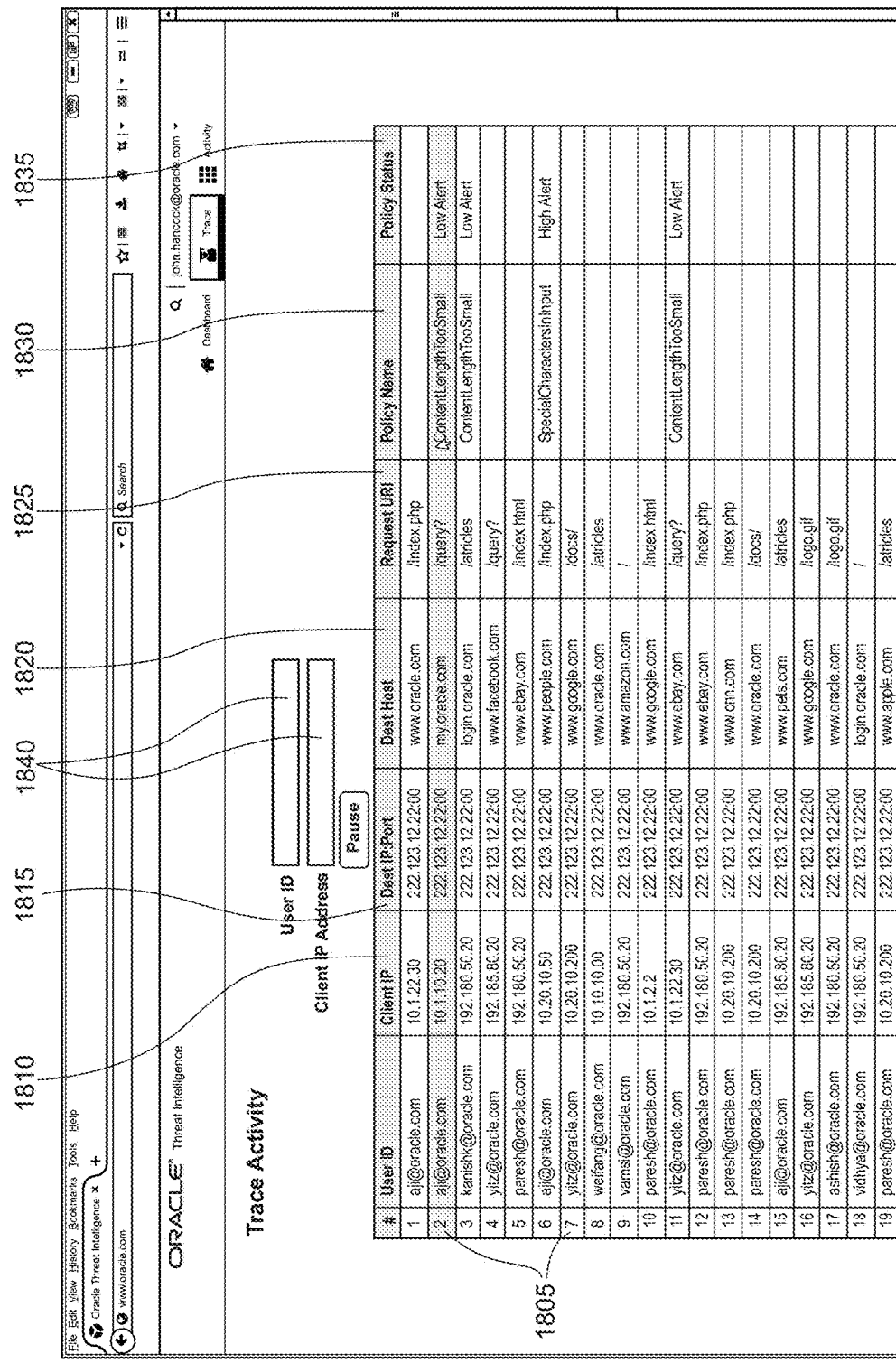
FIG. 18 depicts UIs for displaying trace activity for various sources in accordance with some embodiments.

In various embodiments, the presentation layer 305, application layer 310 and database layer 315 operate to provide UIs 320, 325, 330, and 335, which comprise users, resources being acted upon by users, and the policies, if any, implicated by the such activity. As shown in FIG. 17, some embodiments may provide a consolidated UI 1700 of active threats based on policies being triggered. For example certain embodiments allow for an administrator to view which policies caused a certain action or alert (e.g., a block). FIG. 17 illustrates that the administrator may view in a window 1705 that displays the sources 1705 of activity on the enterprise network that are triggering policies (e.g., the user ID, the group designation, the IP address, client device ID, etc.), an indicator such as the name or classification of the policies 1710 being triggered (e.g., static and dynamic enforcement policies), and the destination 1715 of the activity from the source 1705 (e.g., the resource or service being accessed). These displays enable the administrator to view the policies that are being triggered for each user and resource. In some embodiments, an administrator can select a particular user and focus on the policies that were triggered by the particular user (e.g., 15 of the block policies and 2 of the second factor policies were from this person). FIG. 18 illustrates that the administrator may view the trace activity for the various sources 1805, the client IP address, 1810, the destination IP port 1815, the destination host name 1820, the request URI 1825, each policy 1830 being triggered, and the classification 1840 of the policy, which is indicative of the action taken for the policy 1830. In some embodiments, the trace activity can be queried using search bars 1845.

IV. Processes and Operations for Utilizing a Threat Intelligence Platform

Figure 19:
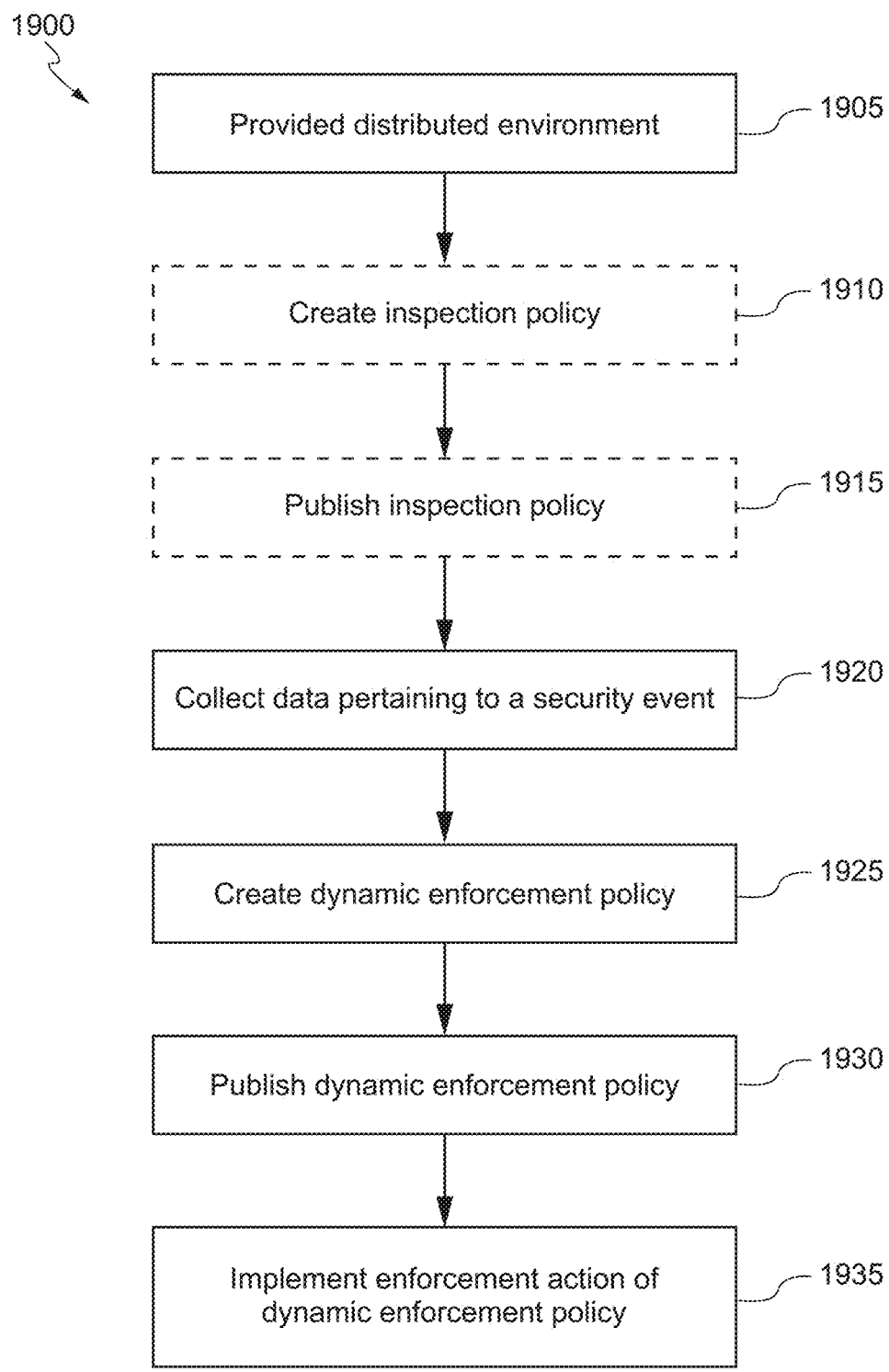
FIG. 19 depicts a flowchart illustrating a process for publishing a dynamic enforcement policy on a policy bus in a distributed environment in accordance with some embodiments.
Figure 20:
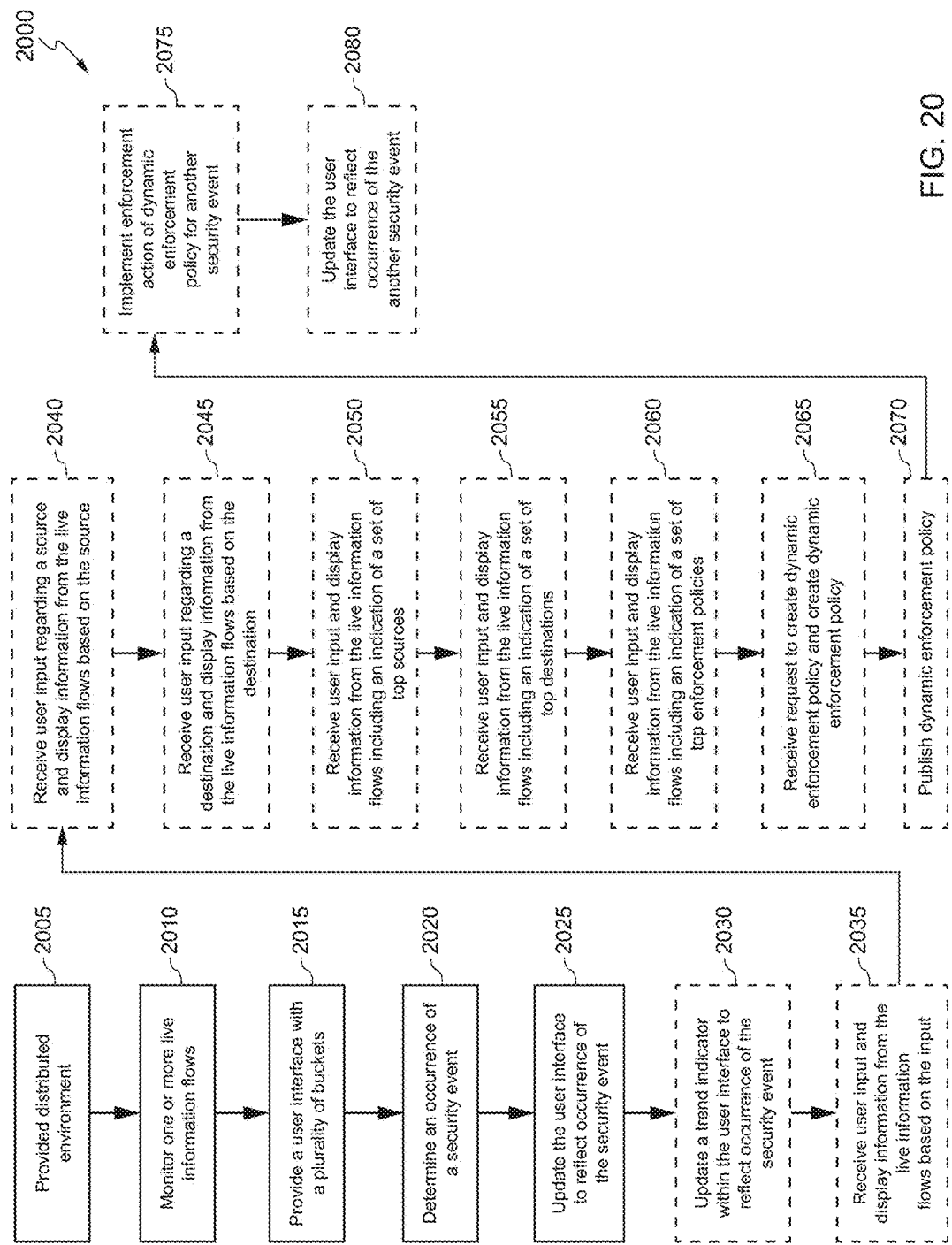
FIG. 20 depicts a flowchart illustrating a process for providing a consolidated view of active threat categories, a count of policies being triggered for each threat category, and associated trends in accordance with some embodiments.
Figure 21:
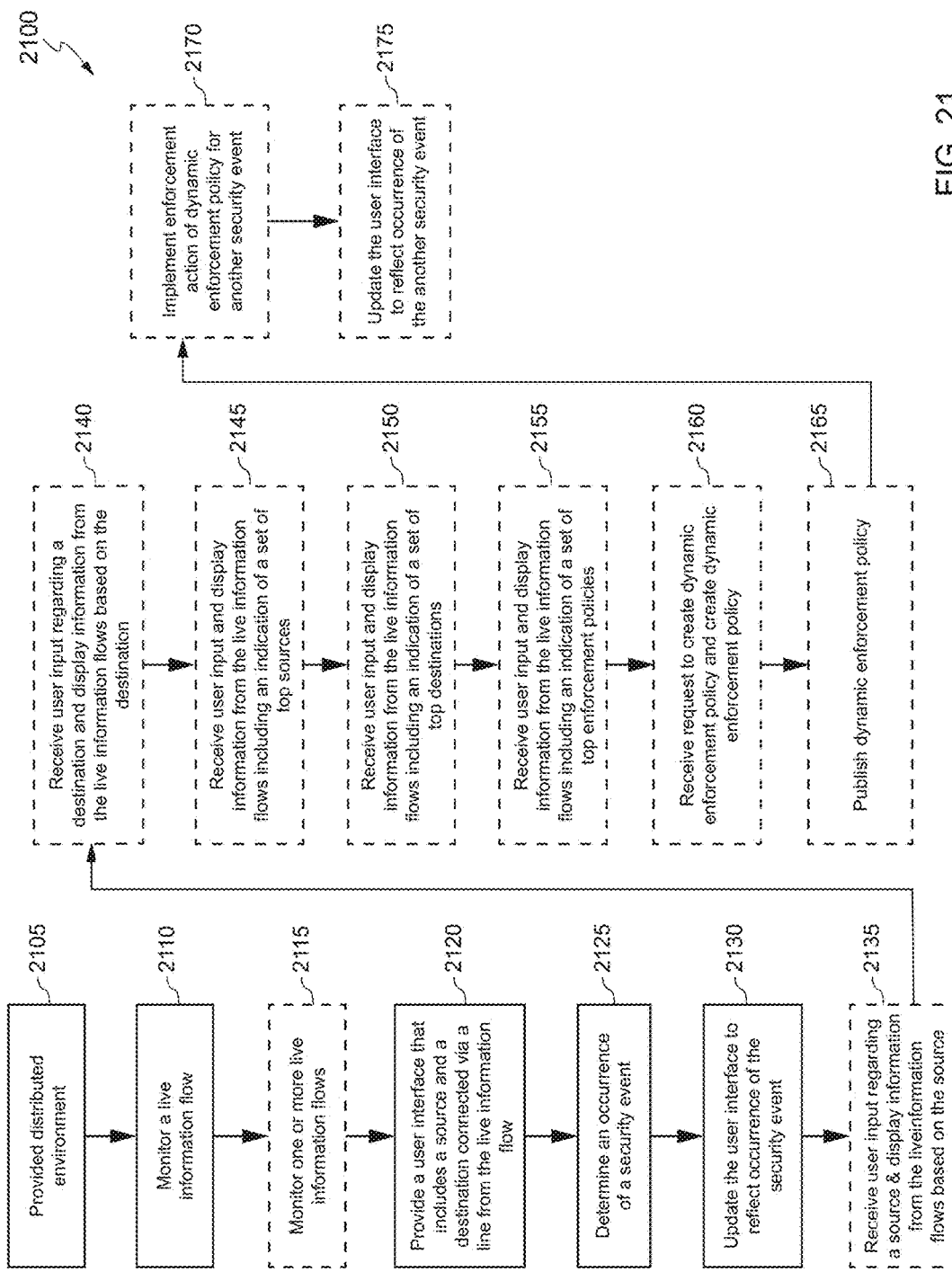
FIG. 21 depicts a flowchart illustrating a process for providing a consolidated view of users, applications being accessed by users, and the access policies, if any, implicated by the such accesses.

FIGS. 19-21 illustrate techniques for analyzing security events using dynamic policies and displaying a consolidated view of active threats and user activity including the dynamic policies being triggered by the active threats and user activity within a distributed environment according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 19-21 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 19-21 is not intended to be limiting. Other sequences of steps may also be performed according to alternative embodiments. For example, in alternative embodiments the steps outlined above may be performed in a different order. Moreover, the individual steps illustrated in FIGS. 19-21 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 19 shows a flowchart 1900 that illustrates a process for creating and publishing dynamic policies according to various embodiments. In some embodiments, the processes depicted in flowchart 1900 may be implemented by the access management and threat detection system 105 and an information management system 110 of FIG. 1, and discussed with respect to FIG. 2. At step 1905, a distributed environment is provided or instantiated that includes a user device, a plurality of agents, a collection bus, a policy bus, and target system having a resource. In some embodiments, the distributed environment further includes an analytics server and a machine learning component, and inspection policies and the dynamic enforcement policies are created by the analytics server and machine learning component. In certain embodiments, the distributed environment further includes memory for storing the inspection policies and the dynamic enforcement policies, and historically data received from one or more information flows.

At optional step 1910, an inspection policy can be created based on the historical data or specifications of a target system or resource. In some embodiments, the collection of data is triggered by an inspection policy published on a policy bus. For example, the collection bus may be configured to obtain the information associated with a security event such as an end user's access request and report the information or data on the report bus. The configuration of the collection bus may be based on default or static inspection policies comprising rules for collecting a predefined set of attributes (e.g., user attributes, resource attributes, object, actions, environment attributes, etc.) when certain criteria is satisfied. In certain embodiments, the system may provide an inspection policy UI that allows an administrator to create the inspection policy by designate the triggering of certain inspection policies when a set of criteria has been met (e.g., if header data matches, for a threshold time interval). In other embodiments, the configuration of the collection may be based on dynamic inspection policies comprising rules for collecting the data or attributes. For example, the collection bus and the analytics server may work together to collect the predefined set of attributes and trigger anomalies based on rules that were previously configured (default, static, or dynamic inspection and enforcement policies). The inspection policies includes rules for collecting the data in real-time, which is a predefined set of attributes pertaining to the security event, when a set of criteria for the security event match a predefined pattern. Once the data comes into the collection bus, it may be stored in memory and becomes part of historical data. The machine learning component can be constantly learning from the historical data and real-time data to create and modify the inspection and enforcement policies to efficiently collect information required for threat assessment of user activity on the system.

At optional step 1915, the inspection policy may be published or injected into the policy bus such that the plurality of agents have access to the inspection policy. Publishing the inspection policy on the policy bus facilitates the collection of data by allowing the listeners (i.e., the agents) to access the policies and enforce the policies to collect the predefined set of attributes based on rules that were previously configured. At step 1920, data may be collected pertaining to a security event. In various embodiments, the data includes: (i) a source that identifies a user or the user device, and (ii) a destination that identifies the target system or the resource. The data may be collected by the collection bus from at least one of the plurality of agents. In some embodiments, the data is collected in accordance with a default, static, or dynamic inspection policy dynamic inspection policy. For example, if criteria of a live information flow including a flow of data from a source to a destination, matches a predefined pattern with in the default, static, or dynamic inspection policy, then the inspection policy may be triggered and one or more agents may collect attributes (e.g., the source and destination) of the information flow or a security event occurring within the information flow. The collected attributes may then be sent to the collection bus for further processing in accordance with various aspects discussed herein.

At step 1925, a dynamic enforcement policy may be created based on the data. The dynamic enforcement policy includes at least a specification of the source, the destination, an enforcement action, and a duration for the dynamic enforcement policy to be active. The duration may be a predetermined period of time of at least 5 minutes, at least 10 minutes, at least 30 minutes, or at least on hour, for example, 10 minutes, 30 minutes, 1 hour, 5 hours, 1 day, or 3 days. During the duration for the dynamic enforcement policy to be active, the dynamic enforcement policy overwrites a static enforcement policy that includes a specification of at least the same source and the same destination. For example, a static enforcement policy may be default or active for a user or group of users from an IP address that requires a first level authentication, whenever any user from that IP address tries to access a resource on a specified target system. A dynamic enforcement policy may be published for a user or group of users from the same IP address that requires a second factor authentication, whenever any user from that IP address tries to access a resource on the same specified target system. The dynamic enforcement policy may have a duration of 5 hours. Accordingly, the static enforcement policy is inactive during the predetermined period of time (e.g., 5 hours), the dynamic enforcement policy is active (e.g., second factor authentication is enforced on requests from the IP address to the specified target system) during the predetermined period of time (e.g., 5 hours), the dynamic enforcement policy is rendered inactive and may be removed from the policy bus after the predetermined period of time has expired, and the static enforcement policy is active (e.g., first level authentication is enforced on requests from the IP address to the specified target system) after the predetermined period of time has expired.

In certain embodiments, the system may provide an enforcement policy UI that allows an administrator to create the dynamic enforcement policy by designate the triggering of certain enforcement actions when a set of attributes has been met (e.g., if a source and destination of a live information flows matches a source and destination of the policy). In other embodiments, the analytics server and a machine learning component create the dynamic enforcement policy. The creating the dynamic enforcement policy may comprise: classifying the data collected in real-time and historical data into one or more data clusters, analyzing the predefined set of attributes using the one or more data clusters, and creating the source, the destination, the enforcement action, and the duration for the dynamic enforcement policy to be active based on the analysis. The one or more data clusters may be generated using supervised or unsupervised machine learning or clustering techniques, and the analyzing may include calculating a distance of the predefined set of attributes from a centroid of the one or more data clusters. The enforcement action such as a block or second factor authentication may be determined based on the distance of the predefined set of attributes from the centroid of the one or more data clusters.

At step 1930, the dynamic enforcement policy may be published on the policy bus such that the plurality of agents have access to the dynamic enforcement policy. Publishing the dynamic enforcement policy on the policy bus facilitates threat detection on for example an enterprise network by allowing the listeners (i.e., the agents) to access the policies and activate enforcement actions of the policies based on rules that were previously configured. At step 1935, the enforcement action for the security event may be implemented based on the dynamic enforcement policy. In some embodiments, at least one of the plurality of agents implements the enforcement action. The enforcement action may be implemented by at least one of the plurality of agents determining that attributes (e.g., a source and destination) of the information flow or a security event occurring within the information flow match the attributes (e.g., the source and destination) within the specification of the dynamic enforcement policy. Thereafter, the enforcement action may be implemented by at least one of the plurality of agents performing the enforcement action, for example, (i) blocking user access to the destination prior the user being authorization for access, (ii) dropping connection of the user with the destination, (iii) blocking authentication of the user on the system, (iii) requesting second factor authentication or authorization, (iv) reporting a low alert, medium alert, or high alert, etc.

FIG. 20 shows a flowchart 2000 that illustrates a process for providing a consolidated view of active threat categories, a count of policies being triggered for each threat category, and associated trends. In some embodiments, the processes depicted in flowchart 2000 may be implemented by the access management and threat detection system 105 and an information management system 110 of FIG. 1, and discussed with respect to FIG. 2. At step 2005, a distributed environment is provided or instantiated that includes a user device, a plurality of agents, a collection bus, a policy bus, and target system having a resource. In some embodiments, the distributed environment further includes an analytics server and a machine learning component, and inspection policies and the dynamic enforcement policies are created by the analytics server and machine learning component. In certain embodiments, the distributed environment further includes memory for storing the inspection policies and the dynamic enforcement policies, and historically data received from one or more information flows.

At step 2010, one or more live information flows may be monitored. The live information flows may include flows of data from a plurality of sources to a plurality of destinations. In some embodiments, the monitoring is performed by the plurality of agents. The monitoring may be performed in accordance with various policies (e.g., inspection and enforcement policies). At step 2015, a user interface may be provide that includes a plurality of buckets. Each bucket may be associated with a different threat level or enforcement action, and each bucket displays a total number of enforcement policies presently triggered in real-time that include the associated threat level or enforcement action. In essence, the buckets are graphical silos classified in accordance with the same classification scheme (e.g., block, second factor authentication, low alert, medium alert, high alert, etc.) assigned to the enforcement policies based on the threat level or enforcement action declared in each policy, as shown in FIG. 4A. Providing the consolidated UI of the of active threats based on threat-level or enforcement action buckets as opposed to policy names may help security administrative groups to focus on different types of threat and actions based on their classification rather than having to interpret the threat level based on the name of a policy.

At step 2020, an occurrence of a security event is determined within the one or more live information flows based on a trigger of an enforcement policy. The enforcement policy may include a specification of a source, a destination, and an enforcement action, and when the data within the one or more live information flows matches at least the source and the destination of the enforcement policy, the enforcement policy is triggered and the enforcement action is applied. At step 2025, the user interface may be updated to reflect the occurrence of the security event by: (i) identifying a bucket from the plurality of buckets that is associated with the enforcement action applied by the enforcement policy, and (ii) increasing the total number of enforcement policies presently triggered in real-time by the enforcement action and displayed within the identified bucket. In some embodiments, the increasing the total number of enforcement policies includes incrementing a count n for the total number of enforcement policies to a count of n+1. Optionally, at step 230, a trend indicator for the identified bucket may be updated based on the occurrence of the security event. For example, updating the trend indicator may comprise displaying an up-arrow, down-arrow, or neutral circle within the identified bucket.

Optionally, at step 2035, a user input may be received corresponding to a selection of a bucket from the plurality of buckets. In some embodiments, in response to the selection, the live information flows including the plurality of sources and the plurality of destinations corresponding to the selected bucket may be displayed within the user interface. In other embodiments, in response to the selection, the plurality of sources corresponding to the selected bucket may be display within the user interface as a tag cloud. The tag cloud may illustrate the plurality of sources corresponding to the selected bucket proportionally based on activity of each source.

Optionally, at step 2040, a user input may be received corresponding to a selection of a particular source from the plurality of sources. In some embodiments, in response to the selection, the live information flows starting at the particular source are displayed. Optionally, at step, 2045, a user input may be received corresponding to a selection of a particular destination from the plurality of destinations. In some embodiments, in response to the selection, the live information flows ending at the particular destination are displayed. Optionally, at step 2050, the live information flows including the plurality of sources and the plurality of destinations may be displayed within the user interface. In some embodiments, an indication of a set of top sources may be provided based on an amount of the data flowing from the plurality of sources to the plurality of destinations. Optionally, at step 2055, the live information flows including the plurality of sources and the plurality of destinations may be displayed within the user interface. In some embodiments, an indication of a set of top destinations may be provided based on an amount of the data flowing from the plurality of sources to the plurality of destinations. Optionally, at step 2060, the live information flows including the plurality of sources and the plurality of destinations may be displayed within the user interface. In some embodiments, an indication of a set of top enforcement policies may be provided based on an amount of the data flowing from the plurality of sources to the plurality of destinations, and a set of active enforcement policies published on the policy busy.

Optionally, at step 2065, a request to create a dynamic enforcement policy may be received based on the data. The dynamic enforcement policy may include a specification of a source, a destination, an enforcement action, and a duration for the dynamic enforcement policy to be active. Optionally, at step 2070, the dynamic enforcement policy may be published on a policy bus such that a plurality of agents have access to the dynamic enforcement policy. As discussed herein, the duration may be a predetermined period of time of at least 5 minutes, at least 10 minutes, at least 30 minutes, or at least on hour, for example, 10 minutes, 30 minutes, 1 hour, 5 hours, 1 day, or 3 days. During the duration for the dynamic enforcement policy to be active, the dynamic enforcement policy overwrites a static enforcement policy that includes a specification of at least the same source and the same destination. Optionally, at step 2075, the enforcement action may be implemented for another security event within the one or more live information flows based on the dynamic enforcement policy. At least one of the plurality of agents may implement the enforcement action. Optionally, at step 2080, the user interface may be updated to reflect the implementation of the enforcement action for the another security event by: (i) identifying a bucket from the plurality of buckets that is associated with the enforcement action applied by the dynamic enforcement policy, and (ii) increasing the total number of enforcement policies presently triggered in real-time by the enforcement action and displayed within the identified bucket.

FIG. 21 shows a flowchart 2100 that illustrates a process for providing a consolidated view of users, applications being accessed by users, and the access policies, if any, implicated by the such accesses. In some embodiments, the processes depicted in flowchart 2100 may be implemented by the access management and threat detection system 105 and an information management system 110 of FIG. 1, and discussed with respect to FIG. 2. At step 2105, a distributed environment is provided or instantiated that includes a user device, a plurality of agents, a collection bus, a policy bus, and target system having a resource. In some embodiments, the distributed environment further includes an analytics server and a machine learning component, and inspection policies and the dynamic enforcement policies are created by the analytics server and machine learning component. In certain embodiments, the distributed environment further includes memory for storing the inspection policies and the dynamic enforcement policies, and historically data received from one or more information flows.

At step 2110, a live information flow may be monitored. The live information flow may include a flow of data from a source to a destination. In some embodiments, the monitoring is performed by the plurality of agents. The monitoring may be performed in accordance with various policies (e.g., inspection and enforcement policies). Optionally, at step 2115, one or more live information flows may be monitored. For example, one or more additional live information flows may be monitored. The additional live information flows may include: (i) flows of data from a plurality of sources to a plurality of destinations, and (ii) one or more enforcement policies triggered by the data. At step 2120, a user interface may be provide that includes the source and the destination connected via a line. For example, each source included within live information flows may be connected via a graphical line to one or more destinations being accessed, as shown in FIG. 17. Optionally, in the instance of monitoring additional live information flows, the user interface may further include: (i) one or more lines connecting each source from the plurality of sources with a corresponding destination from the plurality of destinations, and (ii) an indicator on each line for an enforcement policy triggered by the data flowing between each source and each destination.

At step 2125, an occurrence of a security event may be determined within the live information flow based on a trigger of an enforcement policy. The enforcement policy may include a specification of the source, the destination, and an enforcement action, and when the data within the one or more live information flows matches at least the source and the destination of the enforcement policy, the enforcement policy is triggered and the enforcement action is applied. At step 2130, the user interface may be updated to reflect the occurrence of the security event by: (i) identifying an indicator of the enforcement policy, and (ii) displaying the line connecting the source and the destination running through the indicator of the enforcement policy. In some embodiments, the source is displayed on one side of a window of the user interface, the destination is displayed on a side of the window opposite the side having the source, and the indicator of the enforcement policy is displayed on the line between the source and the destination.

Optionally, at step 2135, a user input may be received corresponding to a selection of a particular source from the plurality of sources. In some embodiments, in response to the selection, the live information flows starting at the particular source including the one or more enforcement policies triggered by the data within the live information flows are displayed. Optionally, at step 2140, a user input may be received corresponding to a selection of a particular destination from the plurality of destinations. In some embodiments, in response to the selection, the live information flows ending at the particular destination including the one or more enforcement policies triggered by the data within the live information flows are displayed. Optionally, at step 2145, the live information flows including the plurality of sources and the plurality of destinations may be displayed within the user interface. In some embodiments, an indication of a set of top sources may be provided based on an amount of the data flowing from the plurality of sources to the plurality of destinations. Optionally, at step 2150, the live information flows including the plurality of sources and the plurality of destinations may be displayed within the user interface. In some embodiments, an indication of a set of top destinations may be provided based on an amount of the data flowing from the plurality of sources to the plurality of destinations. Optionally, at step 2155, the live information flows including the plurality of sources and the plurality of destinations may be displayed within the user interface. In some embodiments, an indication of a set of top enforcement policies may be provided based on an amount of the data flowing from the plurality of sources to the plurality of destinations, and a set of active enforcement policies published on the policy busy.

Optionally, at step 2160, a request to create a dynamic enforcement policy may be received based on the data. The dynamic enforcement policy may include a specification of a source, a destination, an enforcement action, and a duration for the dynamic enforcement policy to be active. Optionally, at step 2165, the dynamic enforcement policy may be published on a policy bus such that a plurality of agents have access to the dynamic enforcement policy. As discussed herein, the duration may be a predetermined period of time of at least 5 minutes, at least 10 minutes, at least 30 minutes, or at least on hour, for example, 10 minutes, 30 minutes, 1 hour, 5 hours, 1 day, or 3 days. During the duration for the dynamic enforcement policy to be active, the dynamic enforcement policy overwrites a static enforcement policy that includes a specification of at least the same source and the same destination. Optionally, at step 2170, the enforcement action may be implemented for another security event within the one or more live information flows based on the dynamic enforcement policy. At least one of the plurality of agents may implement the enforcement action. Optionally, at step 2175, the user interface may be updated to reflect the implementation of the enforcement action for the another security event by: (i) identifying an indicator of the enforcement policy, and (ii) displaying a line connecting the source and the destination running through the indicator of the enforcement policy.

V. Computing Environments

Figure 22:
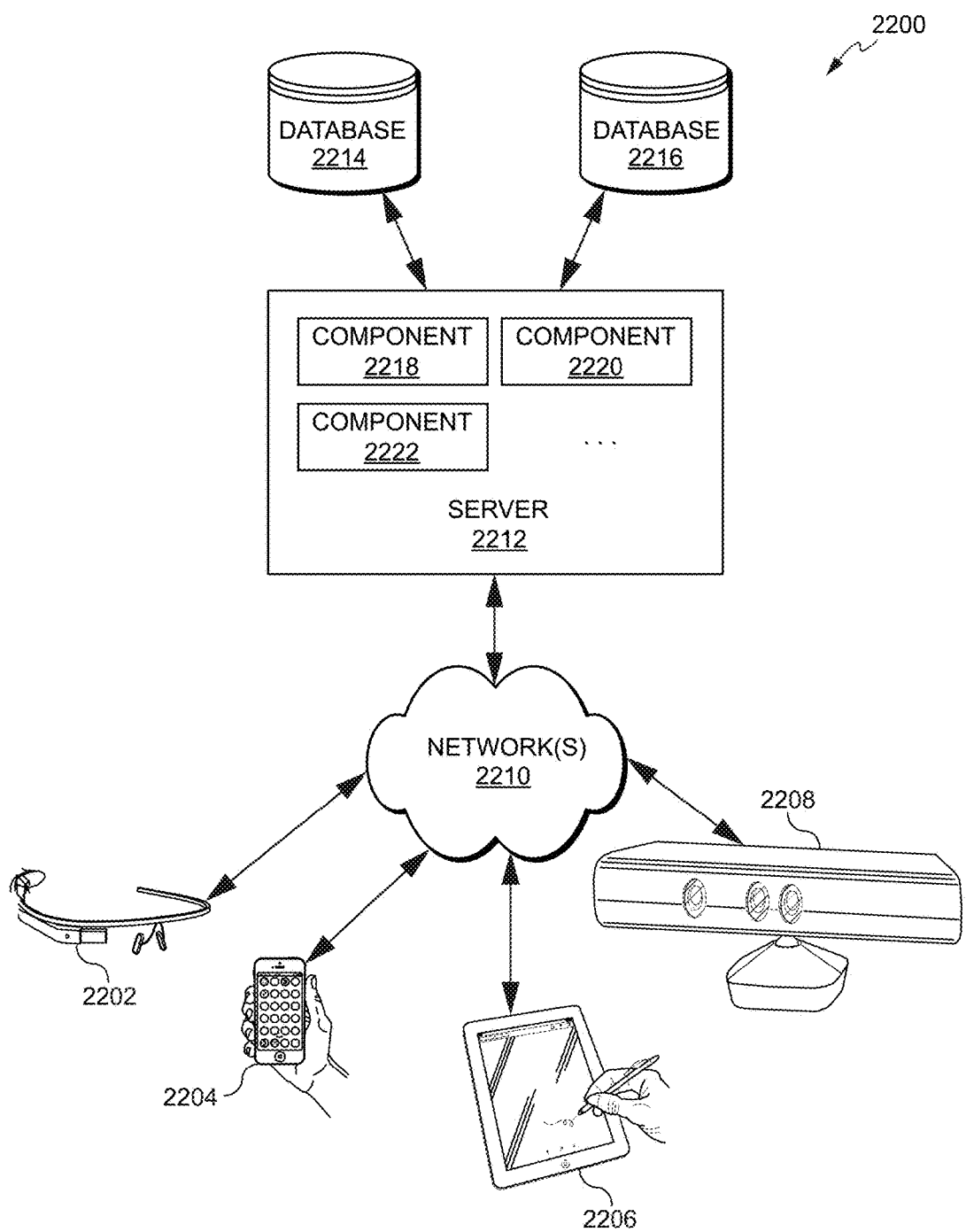
FIG. 22 depicts a simplified block diagram of a distributed system may be used to implement some embodiment of the present disclosure.

FIG. 22 depicts a simplified diagram of a distributed system 2200 for implementing an embodiment of the present disclosure. In the illustrated embodiment, the distributed system 2200 includes one or more client computing devices 2202, 2204, 2206, and 2208, which are configured to execute and operate a client application such as a web browser, proprietary client (e.g., Oracle Forms), or the like over one or more network(s) 2210. The server 2212 may be communicatively coupled with the remote client computing devices 2202, 2204, 2206, and 2208 via network 2210.

In various embodiments, the server 2212 may be adapted to run one or more services or software applications such as services and applications that provide identity management services. In certain embodiments, the server 2212 may also provide other services or software applications can include non-virtual and virtual environments. In some embodiments, these services may be offered as web-based or cloud services or under a Software as a Service (SaaS) model to the users of the client computing devices 2202, 2204, 2206, and/or 2208. Users operating the client computing devices 2202, 2204, 2206, and/or 2208 may in turn utilize one or more client applications to interact with the server 2212 to utilize the services provided by these components.

In the configuration depicted in FIG. 22, the software components 2218, 2220 and 2222 of system 2200 are shown as being implemented on the server 2212. In other embodiments, one or more of the components of the system 2200 and/or the services provided by these components may also be implemented by one or more of the client computing devices 2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The embodiment shown in FIG. 22 is thus one example of a distributed system for implementing an embodiment system and is not intended to be limiting.

The client computing devices 2202, 2204, 2206, and/or 2208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 2210.

Although distributed system 2200 in FIG. 22 is shown with four client computing devices, any number of client computing devices may be supported. Other devices, such as devices with sensors, etc., may interact with the server 2212.

The network(s) 2210 in the distributed system 2200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 2210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 2212 can include one or more virtual machines running virtual operating systems, or other computing architectures involving virtualization. One or more flexible pools of logical storage devices can be virtualized to maintain virtual storage devices for the server. Virtual networks can be controlled by the server 2212 using software defined networking. In various embodiments, the server 2212 may be adapted to run one or more services or software applications described in the foregoing disclosure. For example, the server 2212 may correspond to a server for performing processing as described above according to an embodiment of the present disclosure.

The server 2212 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 2212 may include one or more applications to analyze and consolidate data feeds and/or event updates received from users of the client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 2212 may also include one or more applications to display the data feeds and/or real-time events via one or more display devices of the client computing devices 2202, 2204, 2206, and 2208.

The distributed system 2200 may also include one or more databases 2214 and 2216. These databases may provide a mechanism for storing information such as user identity information, and other information used by various embodiments. Databases 2214 and 2216 may reside in a variety of locations. By way of example, one or more of databases 2214 and 2216 may reside on a non-transitory storage medium local to (and/or resident in) the server 2212. Alternatively, the databases 2214 and 2216 may be remote from the server 2212 and in communication with the server 2212 via a network-based or dedicated connection. In one set of embodiments, the databases 2214 and 2216 may reside in a storage-area network (SAN). Similarly, any necessary files for performing the functions attributed to the server 2212 may be stored locally on the server 2212 and/or remotely, as appropriate. In one set of embodiments, the databases 2214 and 2216 may include relational databases, such as databases provided by Oracle, that are adapted to store, update, and retrieve data in response to SQL-formatted commands.

Figure 23:
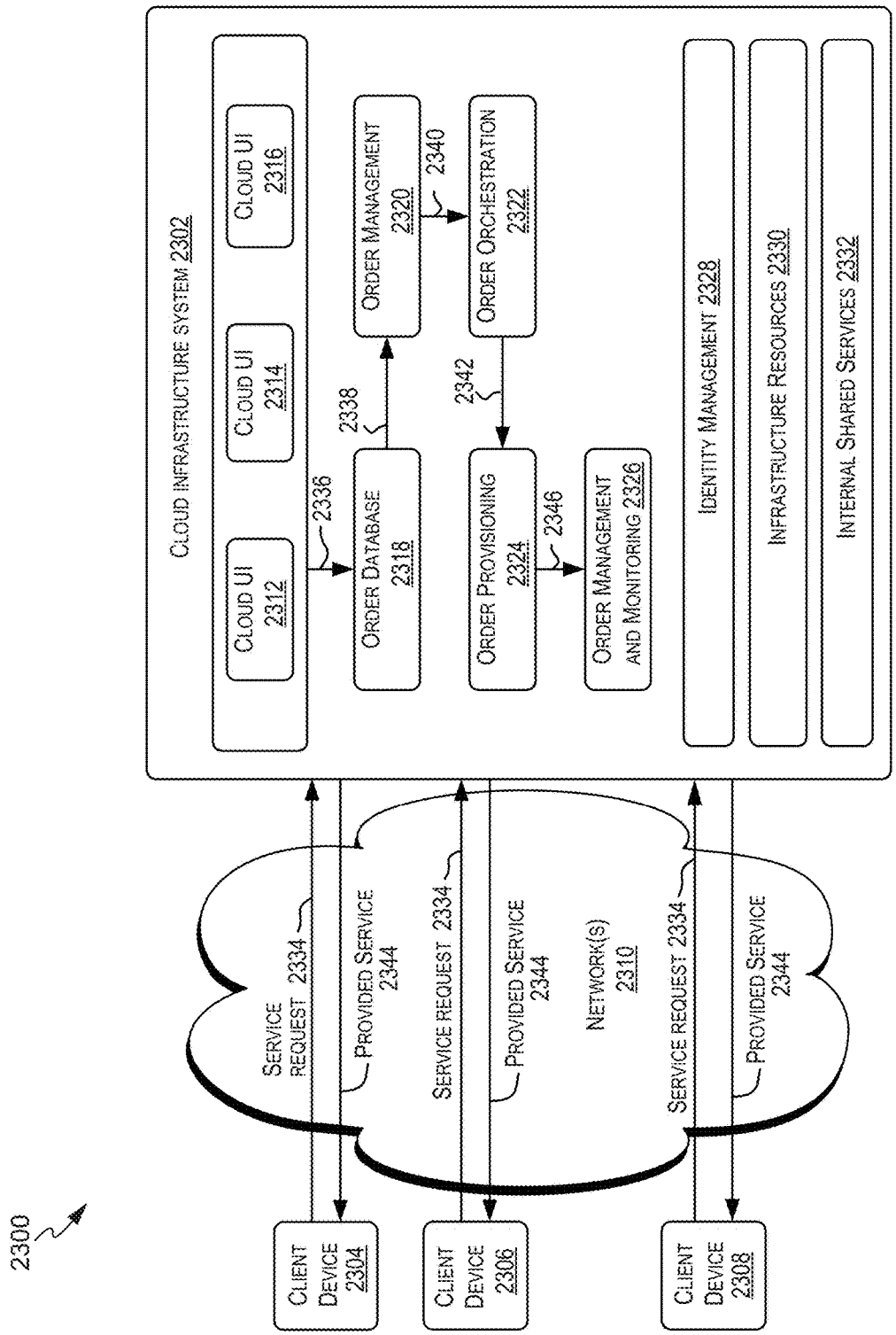
FIG. 23 depicts a simplified block diagram of one or more components of a system environment in which services may be offered as cloud services, in accordance with some embodiments.

In some embodiments, the identity management services described above may be offered as services via a cloud environment. FIG. 23 is a simplified block diagram of one or more components of a system environment 2300 in which services may be offered as cloud services, in accordance with an embodiment of the present disclosure. In the illustrated embodiment in FIG. 23, system environment 2300 includes one or more client computing devices 2304, 2306, and 2308 that may be used by users to interact with a cloud infrastructure system 2302 that provides cloud services, including services for managing entitlements stored in target systems of an organization. Cloud infrastructure system 2302 may comprise one or more computers and/or servers that may include those described above for server 2212.

It should be appreciated that cloud infrastructure system 2302 depicted in FIG. 8 may have other components than those depicted. Further, the embodiment shown in FIG. 8 is only one example of a cloud infrastructure system that may certain embodiments. In some other embodiments, cloud infrastructure system 2302 may have more or fewer components than shown in the figure, may combine two or more components, or may have a different configuration or arrangement of components.

Client computing devices 2304, 2306, and 2308 may be devices similar to those described above for 2202, 2204, 2206, and 2208. Client computing devices 2304, 2306, and 2308 may be configured to operate a client application such as a web browser, a proprietary client application (e.g., Oracle® Forms), or some other application, which may be used by a user of the client computing device to interact with cloud infrastructure system 2302 to use services provided by cloud infrastructure system 2302. Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between clients 2304, 2306, and 2308 and cloud infrastructure system 2302. Each network may be any type of network familiar to those skilled in the art that can support data communications using any of a variety of commercially-available protocols, including those described above for network(s) 710.

In certain embodiments, services provided by cloud infrastructure system 2302 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2302 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle Corporation) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some embodiments, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some embodiments, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2302 may also include infrastructure resources 2330 for providing the resources used to provide various services to customers of the cloud infrastructure system. In one embodiment, infrastructure resources 2330 may include pre-integrated and optimized combinations of hardware, such as servers, storage, and networking resources to execute the services provided by the PaaS platform and the SaaS platform, and other resources.

In some embodiments, resources in cloud infrastructure system 2302 may be shared by multiple users and dynamically re-allocated per demand. Additionally, resources may be allocated to users in different time zones. For example, cloud infrastructure system 2302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2332 may be provided that are shared by different components or modules of cloud infrastructure system 2302 to enable provision of services by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2302, and the like.

In one embodiment, as depicted in FIG. 23, cloud management functionality may be provided by one or more modules, such as an order management module 2320, an order orchestration module 2322, an order provisioning module 2324, an order management and monitoring module 2326, and an identity management module 2328. These modules may include or be provided using one or more computers and/or servers, which may be general purpose computers, specialized server computers, server farms, server clusters, or any other appropriate arrangement and/or combination.

In an exemplary operation, at 2334, a customer using a client device, such as client device 2304, 2306 or 2308, may interact with cloud infrastructure system 2302 by requesting one or more services provided by cloud infrastructure system 2302 and placing an order for a subscription for one or more services offered by cloud infrastructure system 2302. In certain embodiments, the customer may access a cloud User Interface (UI) such as cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 that the customer intends to subscribe to.

At 2336, the order information received from the customer may be stored in an order database 2318. If this is a new order, a new record may be created for the order. In one embodiment, order database 2318 can be one of several databases operated by cloud infrastructure system 2318 and operated in conjunction with other system elements.

At 2338, the order information may be forwarded to an order management module 2320 that may be configured to perform billing and accounting functions related to the order, such as verifying the order, and upon verification, booking the order.

At 2340, information regarding the order may be communicated to an order orchestration module 2322 that is configured to orchestrate the provisioning of services and resources for the order placed by the customer. In some instances, order orchestration module 2322 may use the services of order provisioning module 2324 for the provisioning. In certain embodiments, order orchestration module 2322 enables the management of business processes associated with each order and applies business logic to determine whether an order should proceed to provisioning.

As shown in the embodiment depicted in FIG. 23, at 2342, upon receiving an order for a new subscription, order orchestration module 2322 sends a request to order provisioning module 2324 to allocate resources and configure resources needed to fulfill the subscription order. Order provisioning module 2324 enables the allocation of resources for the services ordered by the customer. Order provisioning module 2324 provides a level of abstraction between the cloud services provided by cloud infrastructure system 2300 and the physical implementation layer that is used to provision the resources for providing the requested services. This enables order orchestration module 2324 to be isolated from implementation details, such as whether or not services and resources are actually provisioned on the fly or pre-provisioned and only allocated/assigned upon request.

At 2344, once the services and resources are provisioned, a notification may be sent to the subscribing customers indicating that the requested service is now ready for use. In some instance, information (e.g. a link) may be sent to the customer that enables the customer to start using the requested services.

At 2346, a customer's subscription order may be managed and tracked by an order management and monitoring module 2326. In some instances, order management and monitoring module 2326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2300 may include an identity management module 2328 that is configured to provide identity services, such as access management and authorization services in cloud infrastructure system 2300. In some embodiments, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.) Identity management module 2328 may also include the management of descriptive information about each customer and about how and by whom that descriptive information can be accessed and modified.

Figure 24:
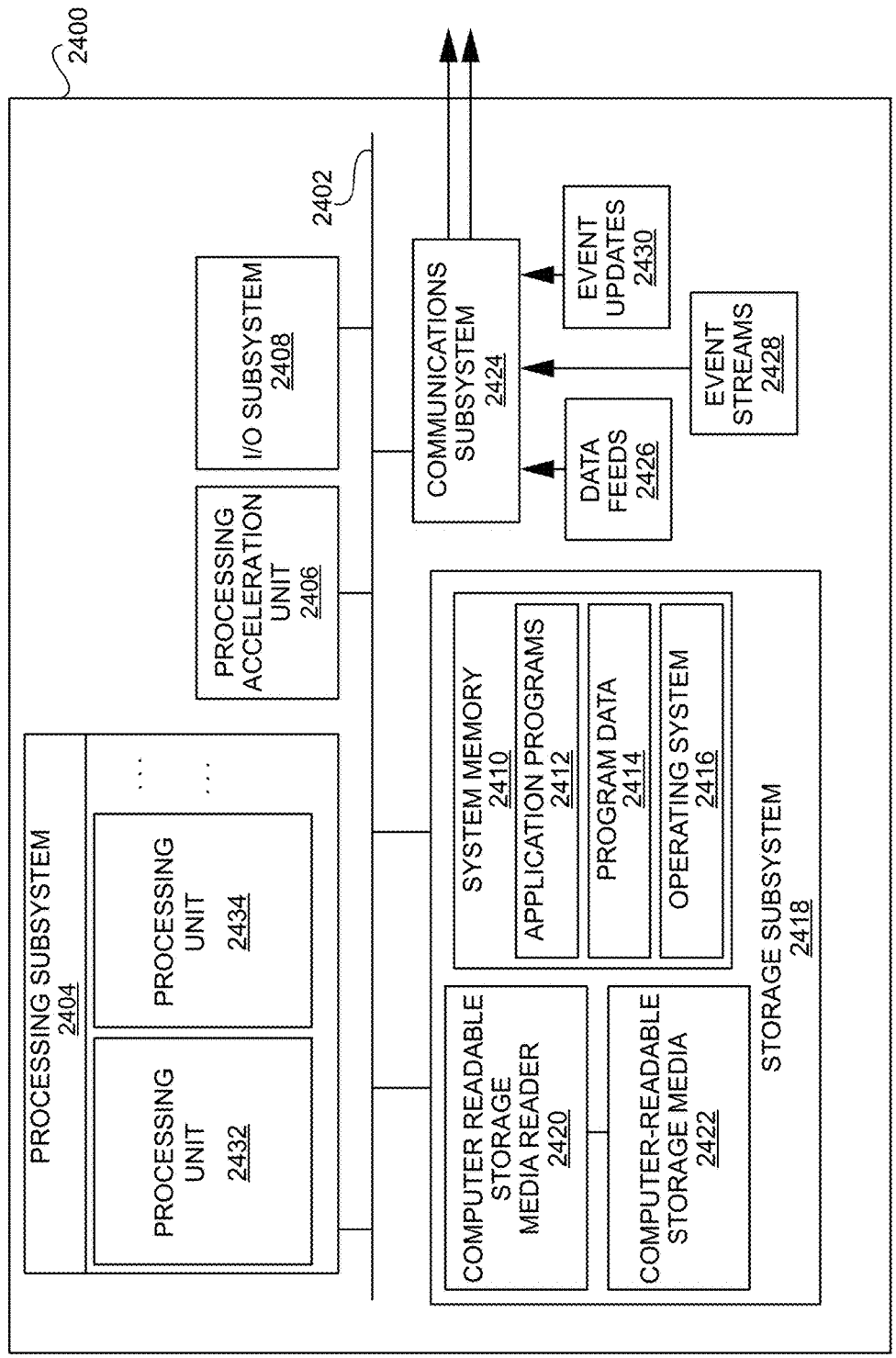
FIG. 24 depicts an exemplary computer system that may be used to implement some embodiment of the present disclosure.

FIG. 24 illustrates an exemplary computer system 2400 that may be used to implement an embodiment of the present disclosure. In some embodiments, computer system 2400 may be used to implement any of the various servers and computer systems described above. As shown in FIG. 24, computer system 2400 includes various subsystems including a processing subsystem 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 may include tangible computer-readable storage media 2422 and a system memory 2410.

Bus subsystem 2402 provides a mechanism for letting the various components and subsystems of computer system 2400 communicate with each other as intended. Although bus subsystem 2402 is shown schematically as a single bus, alternative embodiments of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2404 controls the operation of computer system 2400 and may comprise one or more processing units 2432, 2434, etc. A processing unit may include be one or more processors, including single core or multicore processors, one or more cores of processors, or combinations thereof. In some embodiments, processing subsystem 2404 can include one or more special purpose co-processors such as graphics processors, digital signal processors (DSPs), or the like. In some embodiments, some or all of the processing units of processing subsystem 2404 can be implemented using customized circuits, such as application specific integrated circuits (ASICs), or field programmable gate arrays (FPGAs).

In some embodiments, the processing units in processing subsystem 2404 can execute instructions stored in system memory 2410 or on computer readable storage media 2422. In various embodiments, the processing units can execute a variety of programs or code instructions and can maintain multiple concurrently executing programs or processes. At any given time, some or all of the program code to be executed can be resident in system memory 2410 and/or on computer-readable storage media 2410 including potentially on one or more storage devices. Through suitable programming, processing subsystem 2404 can provide various functionalities described above for dynamically modifying documents (e.g., webpages) responsive to usage patterns.

In certain embodiments, a processing acceleration unit 2406 may be provided for performing customized processing or for off-loading some of the processing performed by processing subsystem 2404 so as to accelerate the overall processing performed by computer system 2400.

I/O subsystem 2408 may include devices and mechanisms for inputting information to computer system 2400 and/or for outputting information from or via computer system 2400. In general, use of the term "input device" is intended to include all possible types of devices and mechanisms for inputting information to computer system 2400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2418 provides a repository or data store for storing information that is used by computer system 2400. Storage subsystem 2418 provides a tangible non-transitory computer-readable storage medium for storing the basic programming and data constructs that provide the functionality of some embodiments. Software (programs, code modules, instructions) that when executed by processing subsystem 2404 provide the functionality described above may be stored in storage subsystem 2418. The software may be executed by one or more processing units of processing subsystem 2404. Storage subsystem 2418 may also provide a repository for storing data used in accordance with the various aspects.

Storage subsystem 2418 may include one or more non-transitory memory devices, including volatile and non-volatile memory devices. As shown in FIG. 24, storage subsystem 2418 includes a system memory 2410 and a computer-readable storage media 2422. System memory 2410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2400, such as during start-up, may typically be stored in the ROM. The RAM typically contains data and/or program modules that are presently being operated and executed by processing subsystem 2404. In some implementations, system memory 2410 may include multiple different types of memory, such as static random access memory (SRAM) or dynamic random access memory (DRAM).

By way of example, and not limitation, as depicted in FIG. 24, system memory 2410 may store application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2422 may store programming and data constructs that provide the functionality of some embodiments. Software (programs, code modules, instructions) that when executed by processing subsystem 2404 a processor provide the functionality described above may be stored in storage subsystem 2418. By way of example, computer-readable storage media 2422 may include non-volatile memory such as a hard disk drive, a magnetic disk drive, an optical disk drive such as a CD ROM, DVD, a Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2422 may provide storage of computer-readable instructions, data structures, program modules, and other data for computer system 2400.

In certain embodiments, storage subsystem 2400 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for storing computer-readable information.

In certain embodiments, computer system 2400 may provide support for executing one or more virtual machines. Computer system 2400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2400. Accordingly, multiple operating systems may potentially be run concurrently by computer system 2400. Each virtual machine generally runs independently of the other virtual machines.

Communications subsystem 2424 provides an interface to other computer systems and networks. Communications subsystem 2424 serves as an interface for receiving data from and transmitting data to other systems from computer system 2400. For example, communications subsystem 2424 may enable computer system 2400 to establish a communication channel to one or more client devices via the Internet for receiving and sending information from and to the client devices. For example, the account management system 112 depicted in FIG. 1 may receive user login information including input related to a training word from client devices using communication subsystem 2424. Additionally, communication subsystem 2424 may be used to communicate notifications of successful logins or notifications to re-enter a password from the account management system to the requesting users.

Communication subsystem 2424 may support both wired and/or wireless communication protocols. For example, in certain embodiments, communications subsystem 2424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2424 can provide wired network connectivity (e.g., Ethernet) in addition to or instead of a wireless interface.

Communication subsystem 2424 can receive and transmit data in various forms. For example, in some embodiments, communications subsystem 2424 may receive input communication in the form of structured and/or unstructured data feeds 2426, event streams 2428, event updates 2430, and the like. For example, communications subsystem 2424 may be configured to receive (or send) data feeds 2426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2424 may be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computer system 2400.

Computer system 2400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2400 depicted in FIG. 24 is intended only as a specific example. Many other configurations having more or fewer components than the system depicted in FIG. 24 are possible. Based on the disclosure and teachings provided herein, a person of ordinary skill in the art will appreciate other ways and/or methods to implement the various embodiments.

While the present embodiments have been described in detail, modifications within the spirit and scope of the embodiments discussed herein will be readily apparent to the skilled artisan. It should be understood that aspects of the various embodiments and portions of various aspects and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

What is claimed is:

1. A system comprising:
   one or more processors; and
   a memory coupled to the one or more processors, the memory storing a plurality of instructions executable by the one or more processors, the plurality of instructions comprising instructions that when executed by the one or more processors cause the one or more processors to perform processing comprising:
   collecting data pertaining to a security event, wherein:
      the data includes: (i) a source that identifies a user or user device, and (ii) a destination that identifies a target system or a resource; and
      the data is collected by a collection bus from at least one of a plurality of agents;
   creating a dynamic enforcement policy based on the data, wherein the dynamic enforcement policy includes a specification of the source, the destination, an enforcement action, and a duration for the dynamic enforcement policy to be active; and
   publishing the dynamic enforcement policy on a policy bus such that the plurality of agents have access to the dynamic enforcement policy,
   wherein during the duration for the dynamic enforcement policy to be active, the dynamic enforcement policy overwrites a static enforcement policy that includes a specification of the source and the destination.

2. The system of claim 1, wherein the process further comprises implementing the enforcement action for the security event based on the dynamic enforcement policy, wherein at least one of the plurality of agents implements the enforcement action.

3. The system of claim 1, wherein:
   the duration is a predetermined period of time of at least 5 minutes;
   the dynamic enforcement policy is rendered inactive and removed from the policy bus after the predetermined period of time has expired;
   the static enforcement policy is inactive during the predetermined period of time; and
   the static enforcement policy is active after the predetermined period of time has expired.

4. The system of claim 1, wherein:
   the collection of the data is triggered by an inspection policy published on the policy bus; and
   the inspection policy includes rules for collecting the data in real-time, which is a predefined set of attributes pertaining to the security event, when a set of criteria for the security event match a predefined pattern.

5. The system of claim 4, wherein the inspection policy and the dynamic enforcement policy are created by an analytics server and a machine learning component.

6. The system of claim 5, wherein the process further comprises creating the inspection policy based on historical data or specifications of the target system or the resource, and publishing the inspection policy on the policy bus such that the plurality of agents have access to the inspection policy.

7. The system of claim 5, wherein the creating the dynamic enforcement policy comprises:
   classifying the data collected in real-time and historical data into one or more data clusters;
   analyzing the predefined set of attributes using the one or more data clusters; and creating the source, the destination, the enforcement action, and the duration for the dynamic enforcement policy to be active based on the analysis.

8. The system of claim 7, wherein:
the one or more data clusters are generated using supervised or unsupervised machine learning or clustering techniques;
the analyzing includes calculating a distance of the predefined set of attributes from a centroid of the one or more data clusters; and
the enforcement action is determined based on the distance.

9. A non-transitory machine readable storage medium having instructions stored thereon that when executed by one or more processors cause the one or more processors to perform a method comprising:
collecting data pertaining to a security event, wherein:
the data includes: (i) a source that identifies a user or a user device, and (ii) a destination that identifies a target system or a resource; and
the data is collected by a collection bus from at least one of a plurality of agents;
creating a dynamic enforcement policy based on the data, wherein the dynamic enforcement policy includes a specification of the source, the destination, an enforcement action, and a duration for the dynamic enforcement policy to be active; and
publishing the dynamic enforcement policy on the policy bus such that the plurality of agents have access to the dynamic enforcement policy; and
implementing the enforcement action for the security event based on the dynamic enforcement policy, wherein at least one of the plurality of agents implements the enforcement action,
wherein during the duration for the dynamic enforcement policy to be active, the dynamic enforcement policy overwrites a static enforcement policy that includes a specification of the source and the destination.

10. The non-transitory machine readable storage medium of claim 9, wherein:
the duration is a predetermined period of time of at least 5 minutes;
the dynamic enforcement policy is rendered inactive and removed from the policy bus after the predetermined period of time has expired;
the static enforcement policy is inactive during the predetermined period of time; and
the static enforcement policy is active after the predetermined period of time has expired.

11. The non-transitory machine readable storage medium of claim 9, wherein:
the collection of the data is triggered by an inspection policy published on the policy bus; and
the inspection policy includes rules for collecting the data in real-time, which is a predefined set of attributes pertaining to the security event, when a set of criteria for the security event match a predefined pattern.

12. The non-transitory machine readable storage medium of claim 11, wherein the inspection policy and the dynamic enforcement policy are created by an analytics server and machine learning component.

13. The non-transitory machine readable storage medium of claim 12, the method further comprising creating the inspection policy based on historical data or specifications of the target system or the resource, and publishing the inspection policy on the policy bus such that the plurality of agents have access to the inspection policy.

14. The non-transitory machine readable storage medium of claim 12, wherein the creating the dynamic enforcement policy comprises:
classifying the data collected in real-time and historical data into one or more data clusters;
analyzing the predefined set of attributes using the one or more data clusters; and
creating the source, the destination, the enforcement action, and the duration for the dynamic enforcement policy to be active based on the analysis.

15. The non-transitory machine readable storage medium of claim 14, wherein:
the one or more data clusters are generated using supervised or unsupervised machine learning or clustering techniques;
the analyzing includes calculating a distance of the predefined set of attributes from a centroid of the one or more data clusters; and
the enforcement action is determined based on the distance.

16. A method comprising:
collecting, by a computing system, data pertaining to a security event, wherein:
the data includes: (i) a source that identifies a user or a user device, and (ii) a destination that identifies a target system or a resource; and
the data is collected by a collection bus from at least one of a plurality of agents;
creating, by the computing system, a dynamic enforcement policy based on the data, wherein the dynamic enforcement policy includes a specification of the source, the destination, an enforcement action, and a duration for the dynamic enforcement policy to be active; and
publishing, by the computing system, the dynamic enforcement policy on the policy bus such that the plurality of agents have access to the dynamic enforcement policy; and
implementing, by the computing system, the enforcement action for the security event based on the dynamic enforcement policy, wherein at least one of the plurality of agents implements the enforcement action,
wherein during the duration for the dynamic enforcement policy to be active, the dynamic enforcement policy overwrites a static enforcement policy that includes a specification of the source and the destination.

17. The method of claim 16, wherein:
the duration is a predetermined period of time of at least 5 minutes;
the dynamic enforcement policy is rendered inactive and removed from the policy bus after the predetermined period of time has expired;
the static enforcement policy is inactive during the predetermined period of time; and
the static enforcement policy is active after the predetermined period of time has expired.

18. The method of claim 16, wherein:
the collection of the data is triggered by an inspection policy published on the policy bus; and
the inspection policy includes rules for collecting the data in real-time, which is a predefined set of attributes pertaining to the security event, when a set of criteria for the security event match a predefined pattern.

19. The method of claim 18, further comprising creating, by the computing system, the inspection policy based on historical data or specifications of the target system or the resource, and publishing the inspection policy on the policy bus such that the plurality of agents have access to the inspection policy.

20. The method of claim 19, wherein the creating the dynamic enforcement policy comprises:
- classifying the data collected in real-time and historical data into one or more data clusters;
- analyzing the predefined set of attributes using the one or more data clusters; and
- creating the source, the destination, the enforcement action, and the duration for the dynamic enforcement policy to be active based on the analysis.

* * * * *

UNITED STATES PATENT AND TRADEMARK OFFICE
CERTIFICATE OF CORRECTION

PATENT NO. : 10,447,738 B2
APPLICATION NO. : 15/705377
DATED : October 15, 2019
INVENTOR(S) : Joseph et al.

Page 1 of 1

It is certified that error appears in the above-identified patent and that said Letters Patent is hereby corrected as shown below:

In the Specification

In Column 2, Line 4, after "day)" insert -- . --.

In Column 17, Line 15, delete "that that" and insert -- that --, therefor.

In Column 25, Line 67, after "the" delete "of".

In Column 33, Line 11, delete "of the of" and insert -- of the --, therefor.

Signed and Sealed this
Fifteenth Day of September, 2020

Andrei Iancu
*Director of the United States Patent and Trademark Office*